US008484894B2

(12) United States Patent
Sakurai et al.

(10) Patent No.: US 8,484,894 B2
(45) Date of Patent: *Jul. 16, 2013

(54) METHOD OF LAMINAR FLOW CONTROL USING A DOOR ASSEMBLY

(75) Inventors: Seiya Sakurai, Seattle, WA (US); Matthew D. Fevergeon, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/551,474

(22) Filed: Jul. 17, 2012

(65) Prior Publication Data

US 2012/0280088 A1 Nov. 8, 2012

Related U.S. Application Data

(62) Division of application No. 12/356,029, filed on Jan. 19, 2009, now Pat. No. 8,245,976.

(51) Int. Cl.
*E05D 15/50* (2006.01)

(52) U.S. Cl.
USPC ............... 49/163; 49/109; 49/73.1; 49/68; 49/104; 49/103; 49/114; 49/400; 49/401

(58) Field of Classification Search
USPC ............. 49/68, 73.1, 98, 103, 104, 109, 114, 49/142, 149, 163, 169, 170, 324, 339, 340, 49/345, 381, 400, 401, 506; 454/76
See application file for complete search history.

(56) References Cited

U.S. PATENT DOCUMENTS

| 1,810,693 A | 6/1931 | Heraclio |
| 2,551,239 A * | 5/1951 | Bond ............................ 296/223 |
| 2,646,945 A * | 7/1953 | Perry ............................ 244/204 |
| 3,230,844 A * | 1/1966 | Isaacs .............................. 49/35 |
| 3,388,878 A | 6/1968 | Peterson |
| 3,421,577 A | 1/1969 | Valyi |
| 4,418,879 A | 12/1983 | Vanderleest |
| 4,522,360 A | 6/1985 | Barnwell et al. |
| 4,575,030 A | 3/1986 | Gratzer |

(Continued)

FOREIGN PATENT DOCUMENTS

| EP | 0532093 | 3/1993 |
| WO | WO03066430 | 8/2003 |

OTHER PUBLICATIONS

International Search Report, PCT/US2010/021331, dated Dec. 89, 2010.

*Primary Examiner* — Katherine Mitchell
*Assistant Examiner* — Marcus Menezes

(57) ABSTRACT

A method of operating a door assembly may include pivoting a first door about a first pivot axis from a closed position to an open position such that the first door acts as an inlet. The method may further include pivoting the first door to the closed position, and pivoting a second door about a second pivot axis from a closed position to an open position when the first door is in the closed position such that the second door acts as an outlet facing in a direction opposite the first door. The method may additionally include pivoting the second pivot axis about the first pivot axis when pivoting the second door, the second door being of a smaller size than the first door and forming at least a portion of the first door.

7 Claims, 12 Drawing Sheets

U.S. PATENT DOCUMENTS

| | | | |
|---|---|---|---|
| 4,836,473 A | 6/1989 | Aulehla et al. | |
| 5,354,015 A | 10/1994 | Meador | |
| 5,779,196 A | 7/1998 | Timar | |
| 5,927,011 A * | 7/1999 | Sickenius | 49/56 |
| 5,931,415 A * | 8/1999 | Lingard et al. | 244/129.5 |
| 6,349,899 B1 * | 2/2002 | Ralston | 244/53 B |
| 6,526,694 B1 * | 3/2003 | Cosgrove | 49/67 |
| 6,634,597 B2 | 10/2003 | Johnson et al. | |
| 6,866,233 B2 | 3/2005 | Patel et al. | |
| 7,059,664 B2 | 6/2006 | Aase et al. | |
| 7,316,460 B2 * | 1/2008 | Takeo et al. | 312/227 |
| 7,832,689 B2 | 11/2010 | Prince et al. | |
| 2002/0166923 A1 | 11/2002 | Munoz | |
| 2006/0102776 A1 * | 5/2006 | Hein et al. | 244/10 |
| 2007/0084122 A1 * | 4/2007 | Watanabe et al. | 49/340 |
| 2007/0221788 A1 | 9/2007 | Meister | |
| 2008/0099631 A1 | 5/2008 | Parikh et al. | |

* cited by examiner

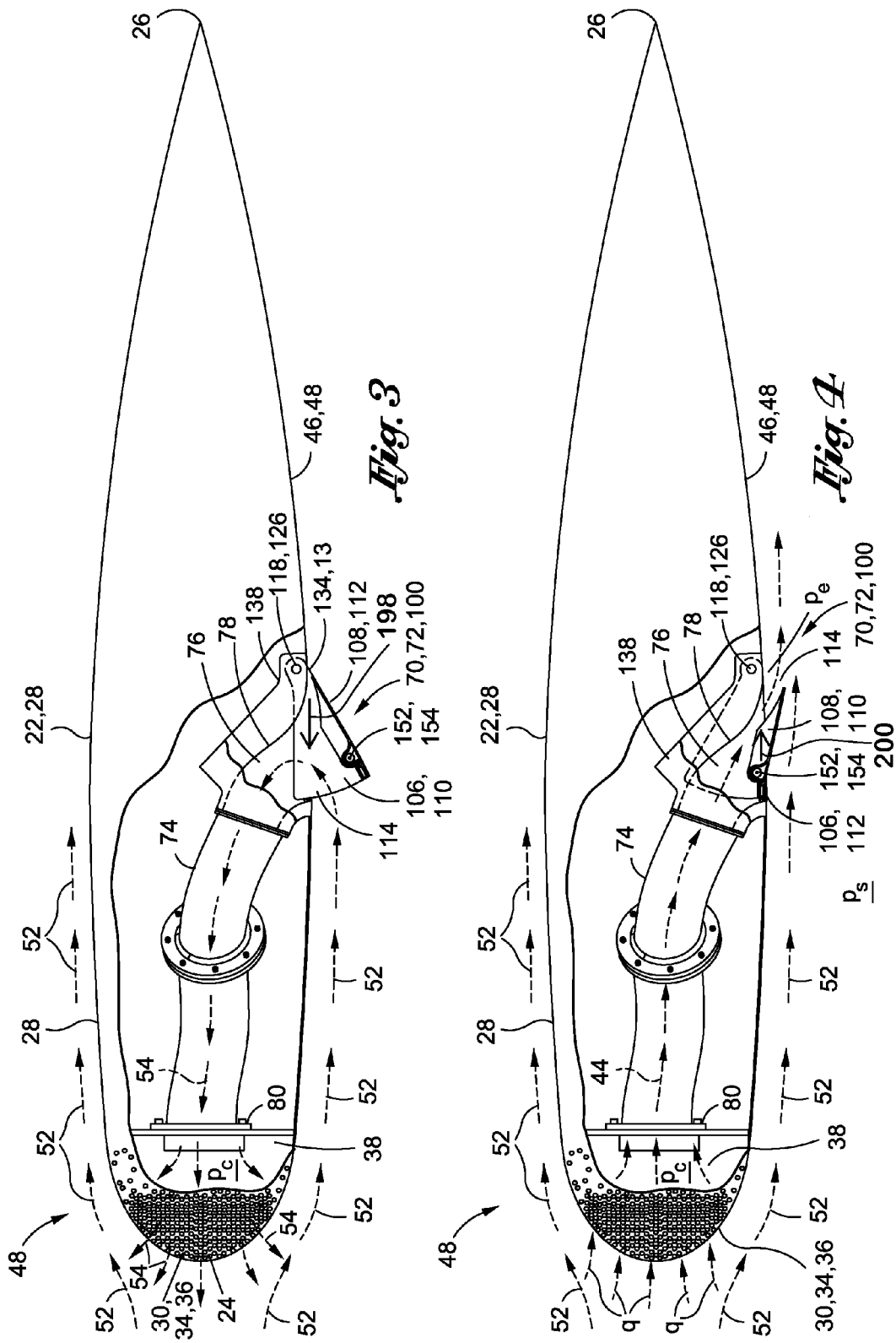

METHOD OF LAMINAR FLOW CONTROL USING A DOOR ASSEMBLY

CROSS-REFERENCE TO RELATED APPLICATIONS

This present application is a divisional application of and claims priority to pending U.S. application Ser. No. 12/356,029 filed on Jan. 19, 2009 and entitled DOOR ASSEMBLY FOR LAMINAR FLOW CONTROL SYSTEM, the entire contents of which is expressly incorporated by reference herein.

FIELD

The present disclosure relates generally to laminar flow control systems for aerodynamic surfaces and, more particularly, to a method of passively suctioning and purging a laminar flow control system.

BACKGROUND

It is generally known that maintaining laminar flow of air passing over an airfoil can improve the aerodynamics and performance of an aircraft. For example, it is known that delaying the transition of boundary layer airflow from laminar flow to turbulent flow over aerodynamic surfaces can reduce skin friction and reduce aerodynamic drag. One method of delaying the transition of airflow from laminar to turbulent flow is by installing a porous skin at critical areas of an airfoil such as along the leading edges of wings, tail surfaces and engine nacelles. The porous skin typically includes a large quantity of apertures or pores of relatively small size. The porous skin may also include narrow slots or elongated pores to provide porosity. In one example, the pores in the porous skin of a wing leading edge may be formed at diameters on the order of several thousandths of an inch (e.g., 0.0025") or less and at spacings of tens of thousandths of an inch (e.g., 0.035") between adjacent pores.

By applying a suction force to the porous skin, boundary layer airflow that is attached to the airfoil (i.e., along the attachment line) may be drawn through the pores to stabilize the boundary layer against small disturbances which may grow and ultimately lead to early transition turbulence. The application of the suction force thins the boundary layer velocity profiles. The net result is a delay in boundary-layer transition, a decrease in skin friction drag, and an increase in aerodynamic efficiency of the aircraft. The increase in aerodynamic efficiency may be especially noticeable at cruise altitudes for long distance flights wherein significant fuel savings may be achievable as a result of reduced aerodynamic drag.

One of the challenges preventing widespread implementation of laminar flow control systems of the suctioning type is the requirement of a relatively large suction force. The suction force must be sufficiently large to draw the boundary layer air through the porous skin. In addition, the suction force must be large enough to duct the suctioned air to another location on the aircraft for discharge into the external atmosphere. Prior art attempts at developing a suctioning system with a sufficiently large suction force have resulted in active suctioning systems that rely on pumps such as compressors to generate the suction force. Active suctioning systems may also rely on engine bleed air drawn from engine compressors or other turbo-machinery to provide the suction force. While generally effective for their intended purposes, active suctioning systems typically require a variety of flow ducts, control valves and other components that add to the weight, complexity and cost of the aircraft and detract from the aircraft operating efficiency.

Another challenge preventing widespread implementation of laminar flow control systems having porous skins is contamination or blockage of pores which can occur under certain conditions. Such contamination may include atmospheric contamination and/or manmade contamination which may reduce the effectiveness of laminar flow control systems. For example, during takeoff and climb-out of an aircraft fitted with porous skins, precipitation in the form of rain or moisture in low-altitude clouds can fill the pores with water that will later freeze as the aircraft climbs into colder air. The frozen moisture blocks the pores and reduces the effectiveness of the suctioning system in maintaining laminar flow over the aircraft during cruise. Manmade contamination such as de-icing fluids applied during ground operations may also reduce the effectiveness of the laminar flow control system by clogging the pores with de-icing fluid.

The accumulation of frost on an aircraft may also reduce the effectiveness of a suctioning system by blocking the pores. Although frost accumulations on exterior surfaces of the porous skin may eventually sublimate away, moisture or liquid on the interior surfaces of the porous skin may become trapped in the pores and will remain due to the relatively small amount of surface area over which the sublimation would otherwise occur. Furthermore, local flow velocities inside the pores are relatively low and therefore insufficient to overcome surface tension resistance of the moisture trapped within the pores.

Prior art attempts at preventing clogging of pores include active purging systems wherein pressurized air is expelled or discharged outwardly through the pores. Such purging systems may be activated prior to takeoff in anticipation of rain or moisture-laden clouds that an aircraft may encounter during climbout. By discharging air through the pores, purging systems maintain the pores in an unblocked state and prevent the freezing of residual liquid that may be trapped within the pores. Although effective for their intended purposes, prior art purging systems suffer from several defects that detract from their overall utility.

For example, all known purging systems for use with suctioning-type laminar flow control systems are of the active type. Active purging systems require energy input into the air on the interior side of the porous skin in order to pressurize the air such that the air may be discharged out of the pores. As in the case with active suctioning systems, pressurized air for active purging systems may be provided by engine compressors or other pumping machinery or may be drawn from engine bleed air. For example, pressurized air for an active purging system may be provided by tapping a portion of the bypass flow of a high-bypass turbofan engine.

As may be appreciated, the system architecture of an active purging system such as one which draws pressurized air from an aircraft engine may be functionally and structurally complex. In addition, the installation of components and machinery for providing the pressurized air adds to the complexity and cost of the aircraft. Furthermore, additional components of an active purging system may increase the weight of the aircraft which may detract from gains in fuel efficiency otherwise attainable with the laminar flow control system.

Even further, aircraft such as commercial airliners are increasingly fabricated without significant bleed air extraction from the engine. Although bleed air has been conventionally used for cabin pressurization and in-flight de-icing, modern aircraft are increasingly employing electrical power as a substitute for conventional engine-generated pneumatic power (i.e., bleed air) in order to maximize the amount of pneumatic power that is available to the engines for producing thrust. As such, conventional engine bleed air may be unavailable on future aircraft for providing pressurized air for use with active purging or suctioning.

As can be seen, there exists a need in the art for a simple, low-cost means for eliminating the need for pumping machinery conventionally associated with active purging and suctioning of a laminar flow control system.

SUMMARY

These and other needs associated with laminar flow control systems are specifically addressed and alleviated by the embodiments disclosed herein which comprise a door assembly for use with a laminar flow control system. The door assembly integrates a first door for passive purging of the laminar flow control system with a second door for passive suctioning of the laminar flow control system without the need for active pumping machinery.

As is know in the art, laminar flow control systems may include a porous skin that is exposable to an external atmosphere which may have an external flow flowing past the porous skin. The porous skin may have an interior skin surface that may define an internal suction cavity. The internal suction cavity may be incorporated into a leading edge of a wing, tail surface or on other areas of an aircraft or other vehicle or structure. The porous skin may include a plurality of pores fluidly connecting the suction cavity to the external flow.

The door assembly may be mounted to an external surface of the aircraft. The door assembly may comprise the first door integrated with the second door wherein the second door may be pivotably mounted to the first door. The second door may comprise a portion of the first door. More specifically, the second door may include a second door cowl that may be pivotably mounted to the first door and may form a portion of the first door cowl.

Each one of the first and second doors is pivotably movable between open and closed positions. In the open position, each one of the first and second doors defines an opening. When the first door is in the open position, the opening of the first door preferably faces in a direction opposite the direction of the opening of the second door when the second door is in the open position. In this regard, the first and second door openings may face away from one another. In one embodiment, the first door opening may be forward-facing or oriented in a first flow direction that may be generally facing a direction of the oncoming external flow. The second door opening may be aft-facing or oriented in a second flow direction that may be generally facing opposite the oncoming external flow. However, the first flow direction of the first door opening may be oriented at any angle relative to the oncoming external flow. Likewise, the second flow direction of the second door opening may be oriented at any angle relative to the oncoming external flow. The first flow direction may be oriented in a direction that is generally opposite the second flow direction although the first and second flow directions may be oriented at any angle relative to the oncoming external flow and/or at any angle relative to one another.

The door assembly may be fluidly connected to the laminar flow control system of the aircraft by a diffuser or other ducting such that when the first door is moved to the open position, the pores of the laminar flow control system may be purged by high pressure external flow captured by the first door and which may be ducted to the suction cavity for discharge through the pores. The discharge of flow through the pores may effectively remove contaminants such as liquid and/or debris that may be trapped in the pores. The discharge of flow through the holes may also prevent contaminants such as water from rain or clouds or de-icing or anti-icing fluid from passing through the pores and entering the suction cavity. In all cases, such contaminants may reduce the effectiveness of the laminar flow control system during various stages of flight.

When the first door is moved to the closed position and the second door is moved to the open position, a suction force may be generated in the suction cavity. In this regard, the opening of the second door may generate an external region aft of the second door that has an external pressure that is less than a cavity pressure within the suction cavity. The external pressure may result in the generation of the suction force within the suction cavity which may draw the external flow located proximate the porous skin through the pores and into the suction cavity. More specifically, the application of the suction force to the porous skin draws a portion of the boundary layer through the pores. As is know in the art, the drawing in or suctioning of the boundary layer may delay transition of the boundary layer to turbulent flow and may decrease skin friction drag.

The door assembly may be actuated by a single actuator or by at least a pair of actuators. For the door assembly having a single actuator, a linkage assembly may couple the actuator to the first and second doors for pivotably moving the first and second doors between the open and closed positions. Additionally, the linkage assembly is configured such that when the first door is in the open position, the second door may be maintained in the closed position, and vice versa.

Each one of the doors may be configured to resist torsional deformation. For example, the first door may include a torque box and a pair of first door side walls that may sealingly engage an arrangement of seals in order to increase the torsional rigidity and minimize twist and the potential for flutter of the first door in response to aerodynamic loading on the first door when in the open position. Likewise, the second door may include a pair of second door side walls that may sealingly engage an arrangement of seals in order to increase the torsional rigidity of the second door.

The technical benefits of the disclosed embodiments include a reduction in the complexity and weight associated with laminar flow control system by combining the first and second doors into a single door assembly. In this regard, the door assembly provides a simple and compact arrangement for use with the passive purging and passive suctioning of a laminar flow control system.

The features, functions and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

These and other features of the present disclosure will become more apparent upon reference to the drawings wherein like numbers refer to like parts throughout and wherein:

FIG. 3 is a sectional illustration taken along line 3-3 of FIG. 2 and illustrating a first door of the door assembly in an open position and a second door mounted to the first door and shown in a closed position;

FIG. 4 is a sectional illustration taken along line 4-4 of FIG. 2 and illustrating the first door in the closed position and the second door in the open position;

DETAILED DESCRIPTION

Figure 1:
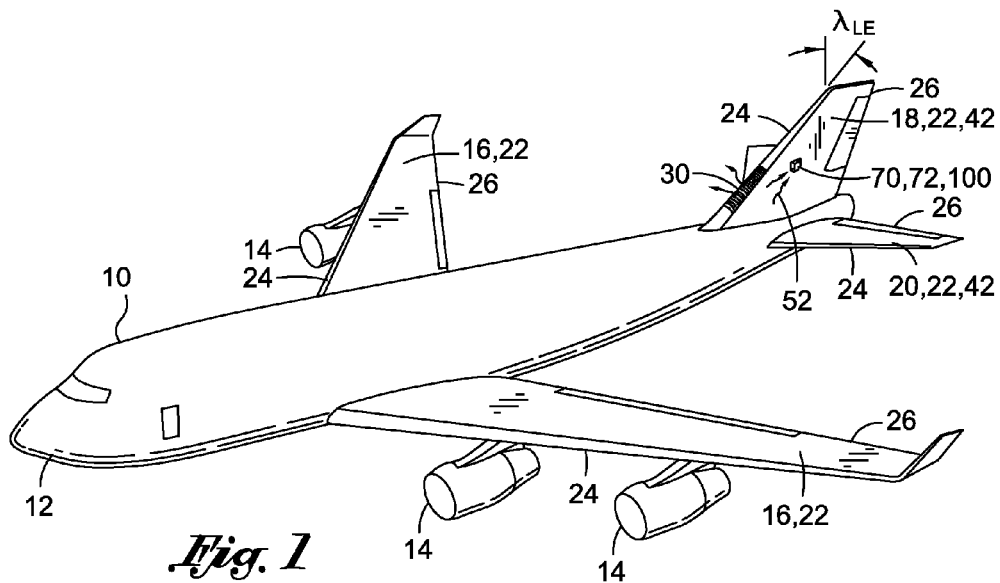
FIG. 1 is a perspective illustration of an aircraft having a door assembly in one embodiment as installed on a tail section of the aircraft.

Referring now to the drawings wherein the showings are for purposes of illustrating preferred and various embodiments of the disclosure only and not for purposes of limiting the same, shown in FIGS. 1-19 is a door assembly 100 as may be used with a laminar flow control system 72. The door assembly 100 may include a first door 106 integrated with a second door 108. Advantageously, by combining the first and second doors 106, 108, the door assembly 100 provides a simple arrangement for passive purging and passive suctioning of a laminar flow control system 72.

Figure 6:
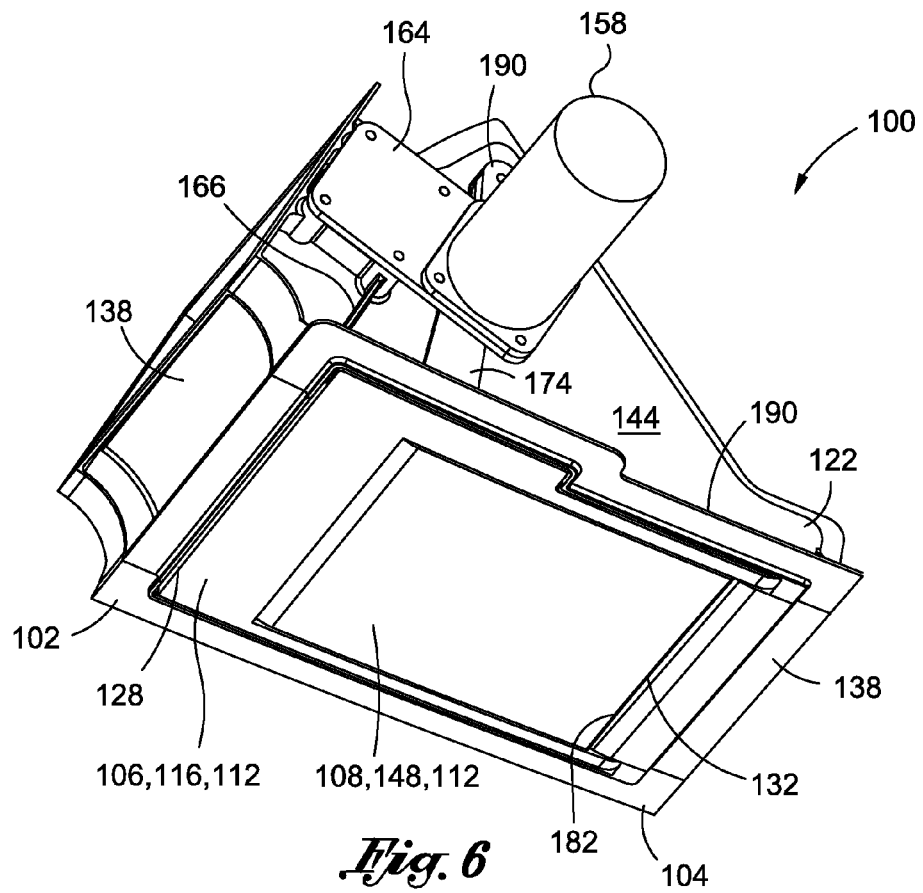
FIG. 6 is a perspective view of the door assembly shown in FIG. 5 and illustrating the first and second doors in the closed position.
Figure 8:
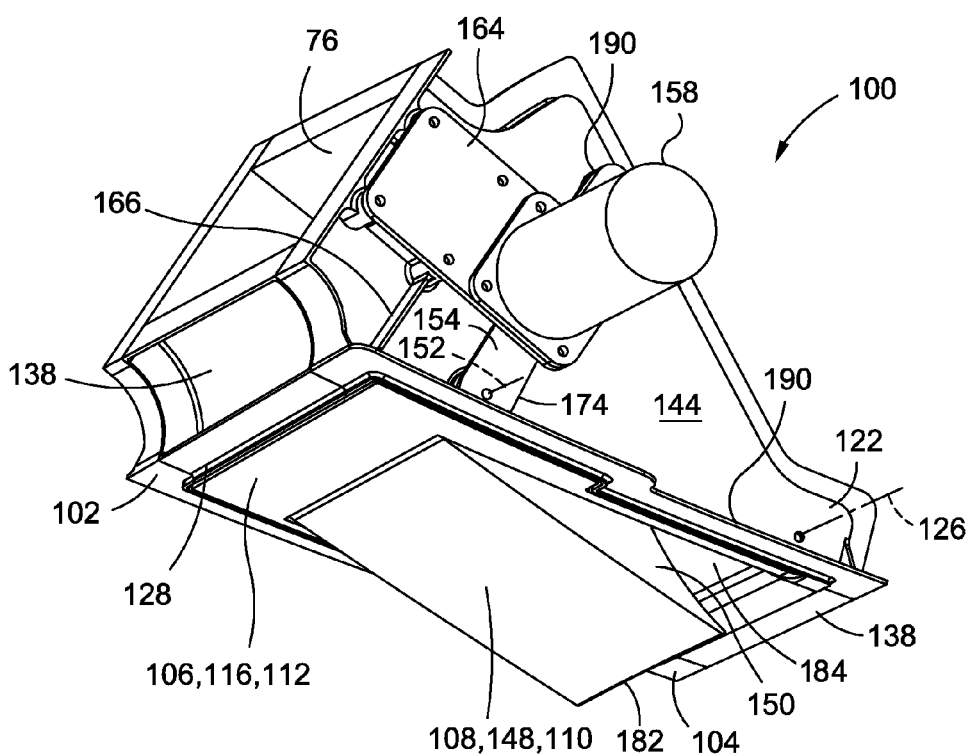
FIG. 8 is a perspective view of the door assembly shown in FIG. 7 and illustrating the first door in the closed position and the second door in the open position.
Figure 10:
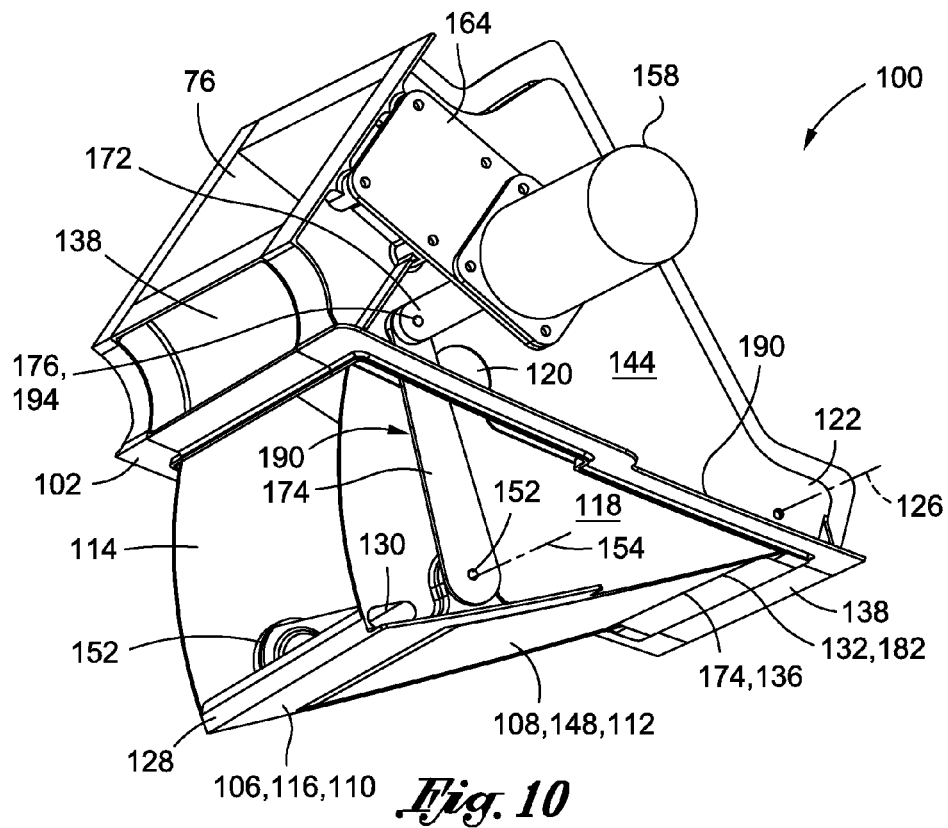
FIG. 10 is a perspective view of the door assembly shown in FIG. 9 and illustrating the first door in the open position and the second door in the closed position.

As shown in FIGS. 6, 8 and 10, the first door 106 may include a first door cowl 116. The second door 108 may include a second door cowl 148 that may be pivotably mounted to the first door 106 and which may form at least a portion of the first door cowl 116. For example, as shown in the Figures, the second door cowl 148 may be configured to comprise a majority of the area of the first door cowl 116 although smaller relative areas of the second door cowl 148 are contemplated. The first and second doors 106, 108 are each pivotably movable between open and closed positions 110, 112. In the closed position 112, the first and second doors 106, 108 may be configured to be substantially flush to an external surface 46 to which the door assembly 100 may be mounted. In the open position 110, each one of the first and second doors 106, 108 defines an opening 114, 184. The door assembly 100 may be configured such that the opening 114 of the first door 106 in the open position faces in a direction that is opposite to the direction of the opening 184 of the second door 108 in the open position.

Figure 2:
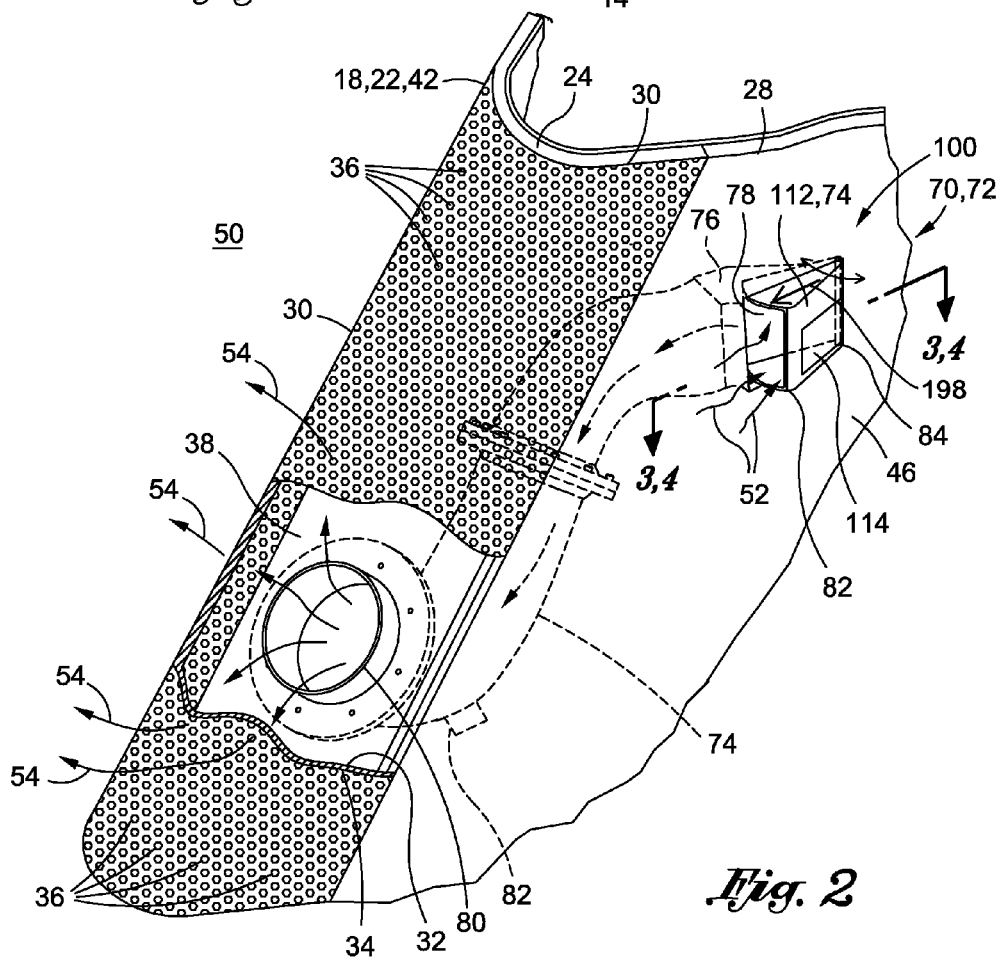
FIG. 2 is an enlarged perspective illustration of the door assembly installed on the tail section and further illustrating the door assembly fluidly connected to a porous skin on a leading edge of the tail section.

Referring to FIG. 1-4, in the context of use with a laminar flow control system 72, the door assembly 100 may be pivotably mounted to the external surface 46 of an aircraft 10 although the door assembly 100 may be mounted on any type of vehicle or structure. As shown in FIG. 2, the door assembly 100 may be fluidly connected to the laminar flow control system 72 of the aircraft 10 by a diffuser 74 or any other suitable ducting. In this regard, the door assembly 100 may form a part of a purging system 70 for the laminar flow control system 72. As is known in the art, the laminar flow control system 72 may include a porous skin 30 that may be positioned to be exposed to an external atmosphere 50. The porous skin 30 may define an exterior skin surface 34 that may form an outer mold line 28 of the aircraft 10.

In one example, the porous skin 30 may be mounted on a leading edge 24 of a wing 16 and/or a tail surface 42 of the aircraft 10 as shown in FIG. 2. However, the porous skin 30 may be mounted on any portion of the wing 16 including, but not limited to, the leading edge 24 and/or trailing edges 26 thereof. In addition, the porous skin 30 may be mounted to the fuselage 12, engine 14 inlet, tail surface 42 and/or on any airfoil 22 or other areas of the aircraft 10 or portions thereof that may be exposed to an external flow 52 of the external atmosphere 50 as may occur during movement of the aircraft 10 relative to the external atmosphere 50 such as during flight.

Although illustrated as being installed on an aircraft 10 in FIG. 1, it should be noted that the door assembly 100 as disclosed herein may be implemented on any type of vehicle including, without limitation, any air vehicle, land vehicle, space vehicle or on any other type of vehicle or structure over which laminar flow may be desired. In addition, the door assembly 100 may be installed for suctioning and/or purging of a porous skin 30 having functionality other than for achieving laminar flow. Furthermore, the functionality of the door assembly 100 is not limited to providing passive suctioning and purging of a porous skin 30 but may be used in any application wherein a suction flow 44 and/or a discharging flow 54 may be desired.

Referring to FIGS. 2-4, the porous skin 30 of the laminar flow control system 72 may define interior and exterior skin surfaces 32, 34. The exterior skin surface 34 of the porous skin 30 may be exposed to the external flow 52. The interior skin surface 32 of the porous skin 30 may define an internal suction cavity 38 as may be incorporated into a leading edge 24 of a wing, tail surface 42 (e.g., horizontal tail 20 and vertical tail 18) or other area of the aircraft 10. The porous skin 30 may include a plurality of pores 36 fluidly connecting the suction cavity 38 to the external flow 52.

Referring to FIG. 4, shown is the deployment of the second door 108 into the open position 110 and the first door 106 in the closed position 112. The door assembly 100 may be mounted such that when the second door 108 is moved to the open position 110, the second door 108 is aft-facing. The second door 108 may define an opening 184 which may be oriented to face in a second flow direction 200. The second flow direction 200 may be opposite to the direction of the oncoming external flow 52 as shown in FIG. 4. However, the second flow direction 200 may be oriented in any direction relative to the external flow 52. For example, the second flow direction 200 may be oriented in angled relation to the oncoming external flow 52. In the same manner, the door assembly 100 may be mounted such that when the first door 106 is moved to the open position 110, the first door 106 may be forward-facing. The first door 106 opening 114 may be oriented to face in a first flow direction 198 which may be in a direction that is facing toward the oncoming external flow 52 as shown in FIGS. 2-3. However, the first flow direction 198 of the first door 106 opening 114 may be oriented in any direction relative to the external flow 52 such as in angled relation to the oncoming external flow 52.

Figure 7:
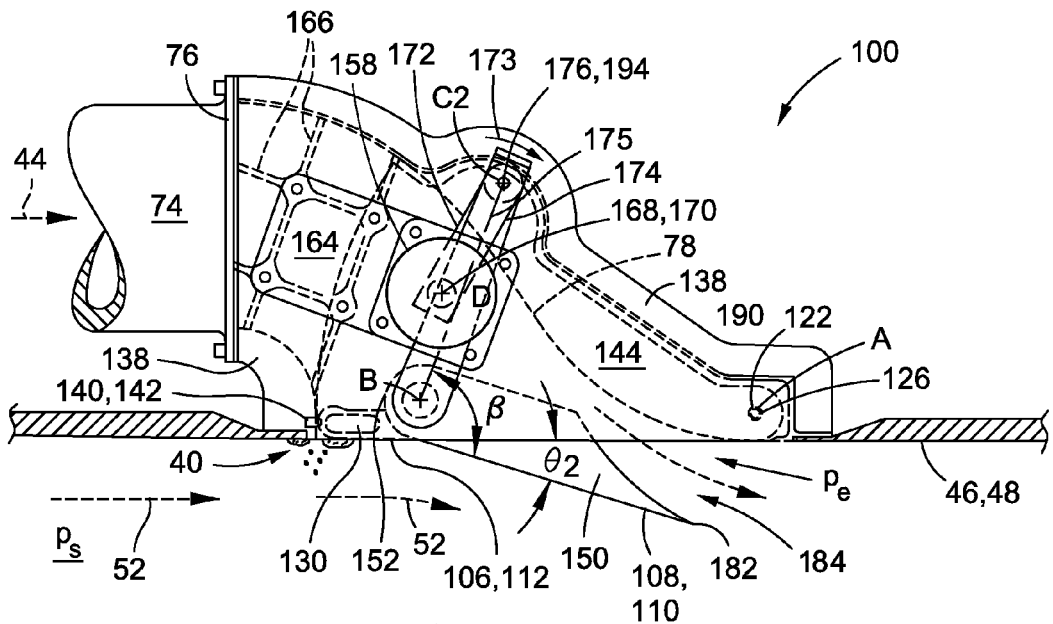
FIG. 7 is a side view of the door assembly illustrating the first door in the closed position and the second door in the open position and further illustrating an external region of relatively low pressure located aft of the second door.

The deployment of the second door 108 into the open position 110 may generate a suction force that may be applied to the suction cavity 38 in order to draw the external flow 52 through the pores 36 and into the suction cavity 38. The suction force may be generated as a result of the external flow 52 flowing past the second door aft edge 182. For example, as shown in FIGS. 4 and 7, the external flow 52 may flow past the second door aft edge 182 in tangential relation to the second door aft edge 182. In this manner, the external flow 52 may generate an external region aft of the second door 108 which has an external pressure $p_e$ that may be less than a cavity pressure $p_c$ within the suction cavity 38 and which may create a suction force on the porous skin 30 as shown in FIG. 4. The application of the suction force to the porous skin 30 draws a portion of the boundary layer airflow through the pores 36 which may result in a delay in boundary-layer transition to turbulence and a decrease in skin friction drag.

Referring still to FIG. 4, the deployment of the second door 108 preferably generates the external pressure $p_e$ which is less than the cavity pressure $p_c$ within the suction cavity 38. In addition, the external pressure of the external region aft of the second door 108 is preferably less than a lowest static pressure $p_s$ of the external flow 52 adjacent the porous skin 30. The magnitude of the external pressure $p_e$ may be dependent in part upon the aircraft 10 altitude or air density and the relative velocity of the external flow 52. The magnitude of the external pressure $p_e$ may also be dependent upon the configuration of the second door 108 in the open position 110. For the example, the magnitude of the external pressure $p_e$ may be dependent upon the extent of outward pivoting of the second door 108 relative to the external surface 46 identified in FIG. 7 as the second door 108 pivot angle $\theta_2$.

The magnitude of the external pressure $p_e$ generated by the second door 108 is preferably sufficient to generate a suction flow 44 that draws the external flow 52 located adjacent the porous skin 30 through the pores 36 and into the suction cavity 38. The suction flow 44 is preferably ducted through the diffuser 74 for discharge through the second door 108 opening 184 into the external atmosphere 50. In this regard, the second door 108 of the door assembly 100 provides a means to passively draw in a portion of the external flow 52 (i.e., a portion of the boundary layer) at the exterior skin surface 34 of the porous skin 30.

Referring to FIG. 3, shown is the first door 106 in the open position 110 and the second door 108 in the closed position 112. The first door 106 may capture the external flow 52 when the first door 106 is in the open position 110. The external flow 52 captured by the first door 106 may be ducted through the diffuser 74 toward the suction cavity 38. The ducted flow is discharged through the pores 36 in order to reduce the potential for blockage of the pores 36 such as from moisture, condensation, rain, snow, de-icing fluids, debris, insect residue and other contaminants. The door assembly 100 is configured such that the first door 106 extends laterally outwardly away from the external surface 46 and into a high pressure region of the external flow 52. As indicated above, the first door 106 may be configured such that when moved to the open position 110, the first door 106 is forward-facing which may be in a direction facing the oncoming external flow 52. The first door 106 opening 114 may define the first flow direction 198 which may generally face toward the external flow 52 but which may be oriented at other angles relative to the direction of the external flow 52.

The magnitude of the discharging flow 54 is dependent in part upon the configuration of the first door 106 in the open position 110 such as the extent of outward pivoting of the first door 106 relative to the external surface 46 to which the door assembly 100 may be mounted. In FIG. 7, the extent of pivoting of the first door 106 is identified as the first door pivot angle $\theta_1$. The extent of pivoting of the first door 106 affects the magnitude of the cavity pressure $p_c$ within the suction cavity 38. In general, the greater the first door pivot angle $\theta_1$, the larger the opening 114 of the first door 106 which may result in an increase in the cavity pressure $p_c$ within the suction cavity 38. By varying the first door pivot angle $\theta_1$, the cavity pressure $p_c$ within the suction cavity 38 can be regulated to provide a desired degree of pressure to overcome the local static pressure q on an exterior skin surface 30 of the porous skin 30.

Likewise, the extent of pivoting of the second door 108 affects the magnitude of the cavity pressure $p_c$ within the suction cavity 38. The greater the second door pivot angle $\theta_2$, the larger the opening 184 of the second door 108 which may result in a larger cavity pressure $p_c$ within the suction cavity 38. By varying the second door pivot angle $\theta_2$, the cavity pressure $p_c$ within the suction cavity 38 can be regulated to provide a desired degree of suction force for drawing a portion of the boundary layer through the pores 36 of the porous skin 30. As may be appreciated, when the first door 106 opening 114 is facing in a direction toward the external flow 52 as shown in FIGS. 2-3, a pressure component at the first door 106 opening 114 may be larger than a pressure component at the second door 108 opening 184 when oriented in a direction opposite the external flow 52 as shown in FIG. 4. The difference in the pressure component at the first door 106 opening 114 as compared to the pressure component (i.e., external pressure $p_e$) at the second door 108 opening 184 results in a difference in cavity pressure $p_c$ when the second door 108 is in the position 110 as compared to the cavity pressure $p_c$ when the first door 106 is in the open position 110. In this regard, for configurations where the door assembly 100 is mounted such that the first door 106 opening 114 is facing toward the external flow 52 as shown in FIGS. 2-3 and the second door 108 opening 184 is facing in a direction opposite the external flow 52 as shown in FIG. 4, the cavity pressure $p_c$ is larger when the first door 106 is open as compared to the cavity pressure $p_c$ when the second door 108 is open.

Figure 5:
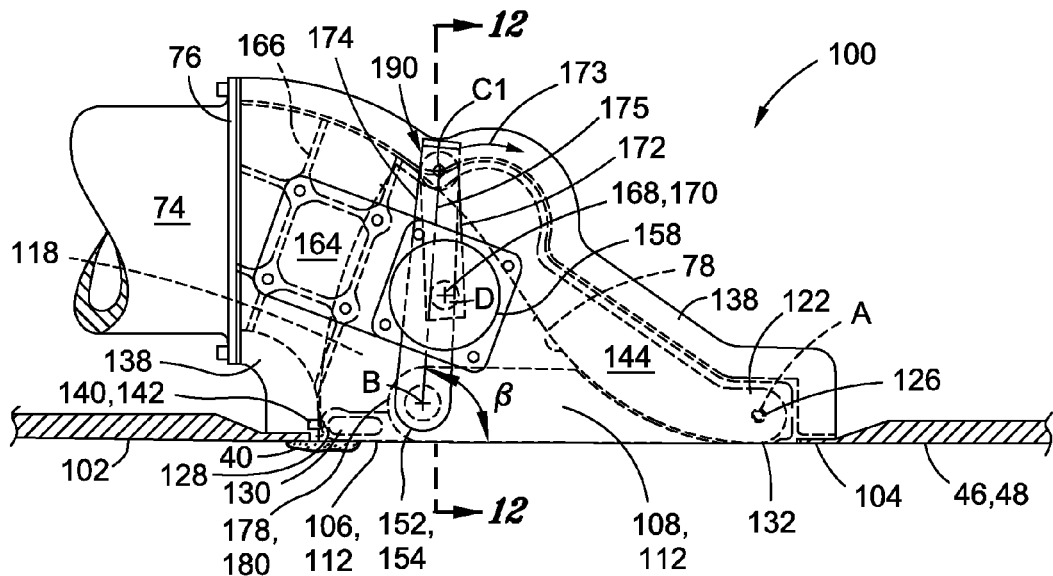
FIG. 5 is a side view of the door assembly in an embodiment having a single actuator coupled to the first and second doors.

Referring to FIGS. 5-12, shown is the door assembly 100 in an embodiment having a single actuator 158 coupled to the first and second doors 106, 108. The door assembly 100 is shown mounted to the external surface 46 such as to an airfoil 22 although the door assembly 100 may be mounted to any surface and at any location on an aircraft 10 or other vehicle or structure. In a preferable embodiment, the door assembly 100 is configured to be mounted in substantially flush relationship with an outer mold line 28 of the external surface 46. More specifically, the first and second doors 106, 108 are preferably configured such that the first door cowl 116 and second door cowl 148 are oriented in substantially flush relationship with the external surface 46 when the first and second doors 106, 108 are in the closed position 112 as shown in FIGS. 5-6.

The door assembly 100 as shown has a forward end 102 and an aft end 104 which may correlate to a direction of movement of the external flow 52 relative to the door assembly 100 or structure to which the door assembly 100 may be mounted. In this regard, the indication of the forward and aft ends 102, 104 in the Figures is not to be construed as limiting alternative orientations of the door assembly 100 relative to the direction of the external flow 52 or relative to the direction of travel of a vehicle or structure to which the door assembly 100 may be mounted.

The door assembly 100 is shown as optionally including a door frame or door casing 138 extending at least partially along a perimeter of the first door 106. The door casing 138 may be disposed on forward and aft ends 102, 104 of the door assembly 100 and may provide a means for interconnecting the door assembly 100 to the external surface 46 such as to a skin panel 48 to which the door assembly 100 may be mounted. Alternatively, it is contemplated that the door casing 138 may be integrally formed with the external surface 46 or skin panel 48 to which the door assembly 100 may be mounted.

The door casing 138 at the aft end 104 may form a portion of a diffuser ramp 78 against which the first and second doors 106, 108 may seal 140 when the first and second doors 106, 108 are in the closed position 112 as will be described in greater detail below. In addition, the diffuser ramp 78 provides a surface along which flow through the first door 106 opening 114 and second door 108 opening 184 may be ducted. The door assembly 100 may include a pair of casing side panels 144 on opposing lateral sides 190 of the door assembly 100 as shown in FIGS. 5-10. The casing side panels 144 may interconnect the door casings 138 at the forward and aft ends 102, 104 of the door assembly 100. In one embodiment, the door casing 138 and casing side panels 144 may be integrally formed as a unitary structure. In addition, the door casing 138 and the casing side panels 144 may optionally be integrally formed with the external structure to which the door assembly 100 may be mounted.

Figure 9:
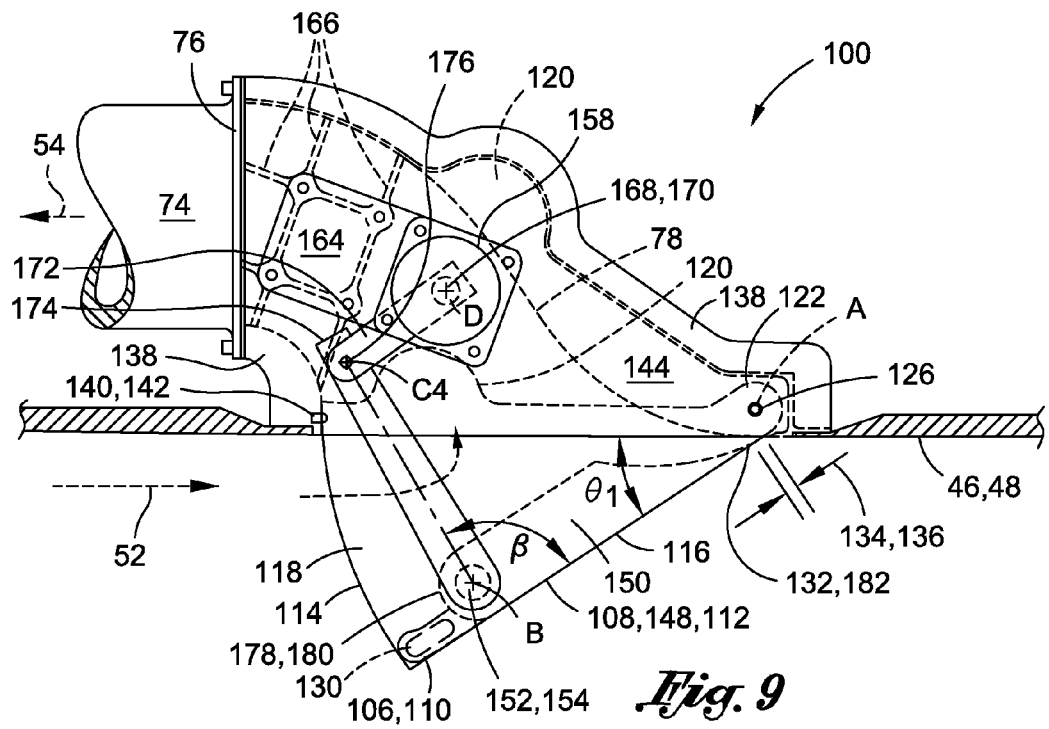
FIG. 9 is a side view of the door assembly illustrating the first door in the open position and the second door in the closed position and further illustrating the first door capturing external flow.

Referring still to FIGS. 5-12, the door casing 138 and casing side panels 144 may include provisions for attachment to a duct such as the diffuser 74 shown in FIGS. 5, 7 and 9. The diffuser 74 provides a means to duct flow between the door assembly 100 and the suction cavity 38 as shown in FIGS. 2-4. The door casing 138 and casing side panels 144 at the forward end 102 of the door assembly 100 may include flanges for attachment to a mating flange formed on the diffuser 74. The attachment of the door casing 138 and casing side panels 144 to the diffuser 74 is preferably such that unobstructed flow is provided between the diffuser 74 and the door assembly 100. Although the diffuser 74 is shown as being attached to the door assembly 100 at a direction that is generally parallel to the external surface 46, the door casing 138 and casing side panels 144 may be configured to provide alternative angles of attachment to the diffuser 74.

Figure 11:
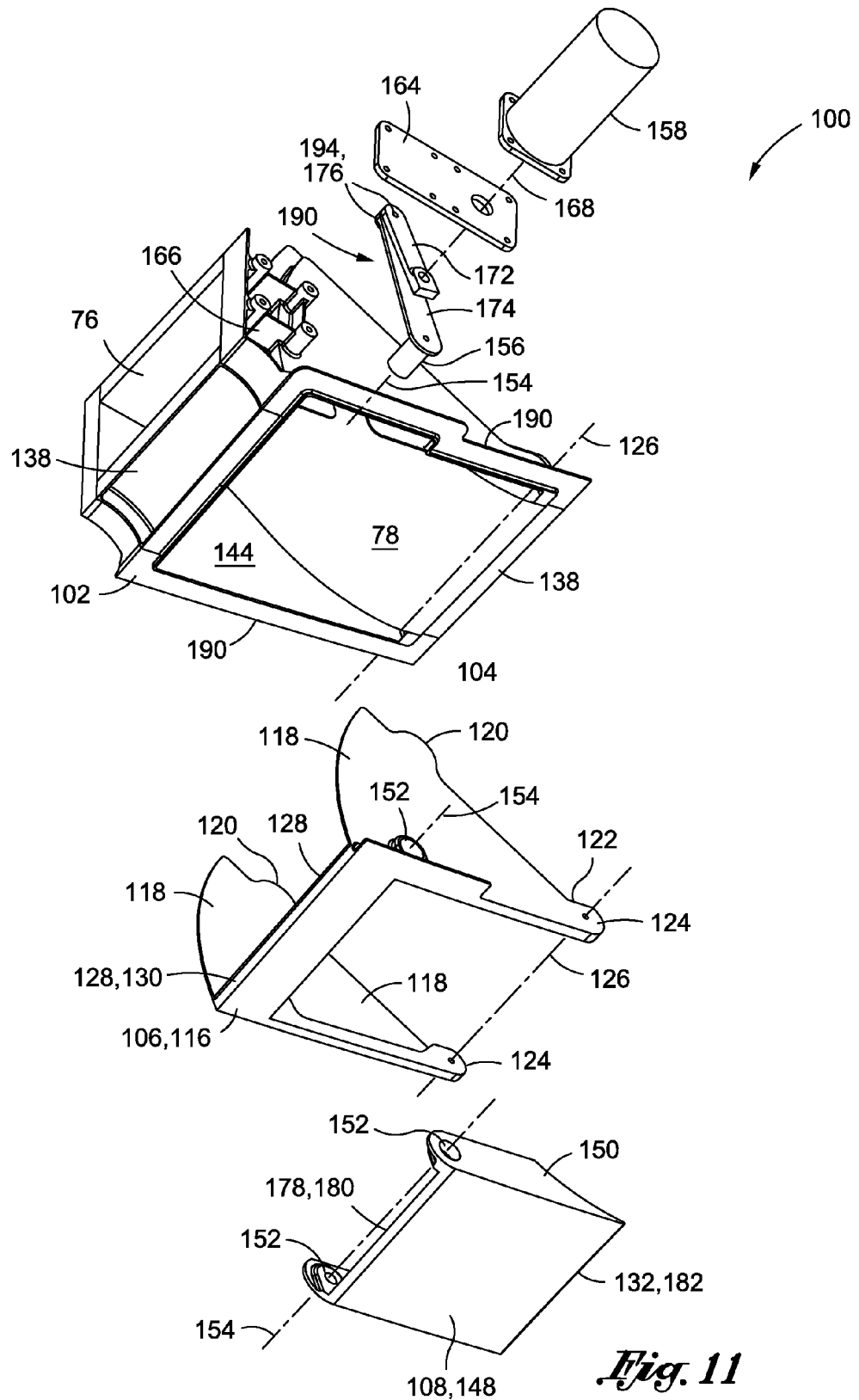
FIG. 11 is an exploded perspective view of the door assembly illustrating the interconnectivity of the actuator to the first and second doors using a linkage assembly.

Referring still to FIGS. 5-12, the actuator 158 is shown as being positioned adjacent to a lateral side 190 of the door assembly 100. For example, FIGS. 5-12 illustrate the actuator 158 being mounted to one of the casing side panels 144 using an actuator mounting bracket 164 that may be secured to one or more ribs 166 or other features formed on the casing side panel 144 as best seen in FIG. 11. Furthermore, the actuator 158 is not limited to mounting on the door assembly 100 but may alternatively be mounted on structure adjacent to the door assembly 100 such as support structure that may form part of the aircraft 10 to which the door assembly 100 may be mounted. The actuator 158 may be configured as a rotary actuator 158 in one embodiment. The rotary actuator 158 may define an actuator axis 168 oriented perpendicularly relative to the casing side panel 144 although other orientations are contemplated.

The actuator 158 may include a rotatable actuator shaft 170 which is coincident with point "B" indicated in FIGS. 5, 7 and 9. The actuator shaft 170 may extend through a clearance hole formed in the actuator mounting bracket 164. The door assembly 100 may include a linkage assembly 192 to interconnect the actuator shaft 170 to the first and second doors 106, 108 for pivotably moving the first and second doors 106, 108 between the open and closed positions 110, 112. More particularly, as shown in FIGS. 5-12, the linkage assembly 192 may interconnect the actuator 158 to the first and second doors 106, 108 at a second pivot axis 154. The second door 108 includes a second door hinge 152 to facilitate pivoting of the second door 108 about the second pivot axis 154. The first door 106 includes a first door hinge 122 to facilitate pivoting of the first door 106 about the first pivot axis 126. The first door hinge 122 may comprise an opposing pair of pivot flanges 124 coupled to the opposing pair of casing side panels 144 using a pair of pins or other suitable mechanical fasteners as best seen in FIG. 11. The first and second pivot axes 126, 154 may be oriented in spaced parallel relation to one another.

Figure 12:
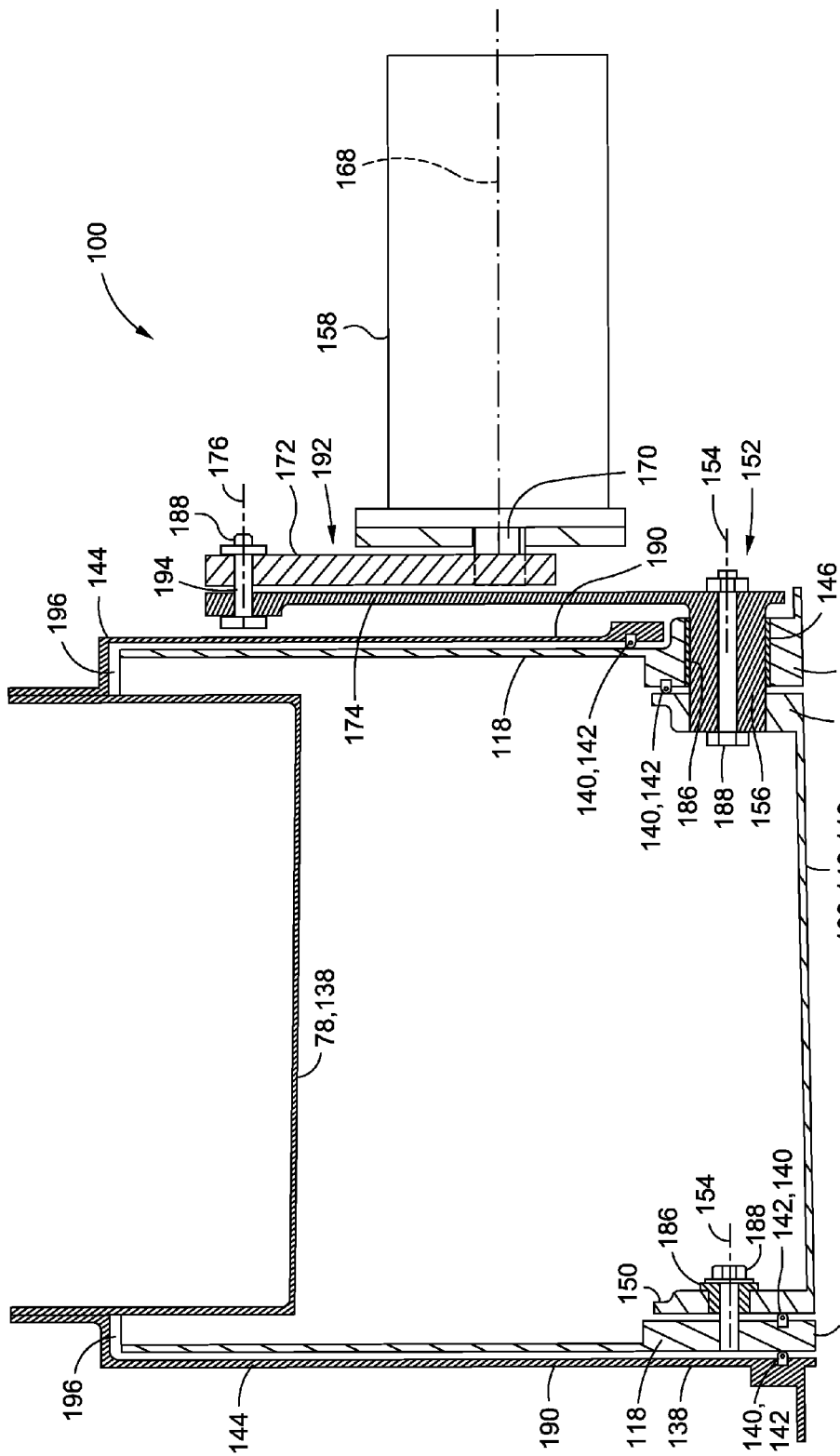
FIG. 12 is a cross section of the door assembly taken along lines 12-12 of FIG. 5 and illustrating the linkage assembly being pivotably coupled to the first door and fixedly coupled to the second door.

The attachment point for the linkage to the first and second doors 106, 108 is preferably along the second pivot axis 154 at one of opposing lateral side 190 of the first and second doors 106, 108 as shown in FIG. 12. The linkage assembly 192 is specifically configured such that the actuator 158 may pivot the first and second doors 106, 108 between the open and closed positions 110, 112. Additionally, the linkage assembly 192 is configured such that when the first door 106 is in the open position 110, the second door 108 may be maintained in the closed position 112, and vice versa.

Referring to FIGS. 5 and 7, the linkage assembly 192 is specifically configured such that with the first door 106 in the closed position 112, a first door forward edge 128 of the first door 106 may initially be caused to move slightly inwardly relative to the external surface 46 prior to outward pivoting movement of the first door 106 toward the open position 110. The slight inward movement of the first door forward edge 128 may facilitate the breakup of ice or other contamination 40 that may be caked or otherwise deposited across the interface between the first door forward edge 128 and the door casing 138 and which may otherwise block or prevent outward pivoting of the first door 106. The initially inward pivoting of the first door 106 may require less force against the resistance of unbroken ice or other contamination 40 than the force required to initially outwardly pivot the first door 106.

As shown in FIGS. 5-12, the linkage assembly 192 may include a radial arm 172 fixedly mounted to the actuator shaft 170 and extending radially outwardly therefrom and terminating at a free end 194. A link 174 may be pivotally connected to the free end 194 of the radial arm 172 at an arm pivot 176 by a pin 188 or other suitable element inserted through the arm pivot 176. The movement of the arm pivot 176 or free end 194 may define an arcuate path indicated at relative points therealong as point "C1" in FIG. 5, as point "C2" in FIG. 7 and as point "C4" in FIG. 9. As is described in greater detail below, such points are associated with the open and closed positions 110, 112 of the first and second doors 106, 108 during rotational movement of the radial arm 172 under the influence of the actuator 158. The link 174 may be pivotally connected to the free end 194 of the radial arm 172 and may extend to the second pivot axis 154. The linkage assembly 192 facilitates pivotable coupling of the link 174 to the first door 106 and fixed coupling of the link 174 to the second door 108. The link 174 is freely pivotable about the second pivot axis 154 such that rotation of the radial arm 172 causes the first door 106 to pivotably move between the open and closed positions 110, 112.

As best seen in FIG. 12, the link 174 is pivotably coupled to the first door 106. The link 174 may include a door shaft 156 fixedly mounted to the link 174 and which is sized and configured to extend through a bore 146 formed in one of the first door side walls 118. A bushing, bearing 186 or other suitable low-friction mechanism may be interposed between the door shaft 156 and the bore 146 to provide a snug and freely-rotatable fit between the door shaft 156 and the bore 146 and which collectively form a second door hinge 152 for the second door 108. The second door hinge 152 is also comprised of a pin 188 (e.g., mechanical fastener) that preferably extends through the bushing in the second door side wall 150 and into the first door side wall 118 to secure the link 174 to the first and second doors 106, 108.

As shown in FIG. 12, the door shaft 156 may be fixedly coupled to the second door 108 at the second pivot axis 154 by suitable coupling such as splines formed on the door shaft 156 which may be engageable to mating splines formed in the second door side wall 150. The link 174 and the second door 108 are fixedly coupled to one another at a fixed angle θ such that angular movement of the link 174 as a result of rotation of the actuator 158 causes a corresponding degree of angular movement of the second door 108 about the second pivot axis 154. In this regard, the link 174 acts as a crank mechanism for pivotably moving the second door 108. Although splines are illustrated for fixedly coupling of the link 174 to the second door 108, any suitable mechanism may be used.

As described above, the linkage assembly 192 is pivotably coupled to the first door 106 at the second pivot axis 154 such that rotation of the radial arm 172 causes pivoting of the first door 106 about the first pivot axis 126. The linkage assembly 192 is fixedly coupled to the second door 108 at the second pivot axis 154 such that rotation of the radial arm 172 causes pivoting of the second door 108 about the second pivot axis 154. In this manner, the linkage assembly 192 provides a means for simple actuation of the first and second doors 106, 108 using a single actuator 158.

Referring to FIGS. 5 and 7, shown are side views of the door assembly 100 wherein the first and second doors 106, 108 are in the closed position 112 in FIG. 5 and the second door 108 is pivoted into the open position 110 in FIG. 7. Rotational movement of the actuator shaft 170 and radial arm 172 occurs about point "D" which is coincident with the actuator axis 168 as was mentioned above. The link 174 may be pivotally connected to the free end 194 of the radial arm 172 at the arm pivot. The free end 194 and the arm pivot 176 move along the arcuate path defined by several points therealong labeled as point "C1" in FIG. 5, as point "C2" in FIG. 7 and as point "C4" in FIG. 9. During initial movement of the radial arm 172 along a clockwise direction 173 from point C1 to point C2, the second door 108 moves from the closed position 112 as shown in FIG. 5 to the open position 110 as shown in FIG. 7 due to the fixed angle β between the link 174 and the second door 108. Simultaneously, during such angular movement of the radial arm 172 along the clockwise direction 173 from point C1 toward point C2, the first door 106 is also caused to pivot slightly inwardly toward the actuator 158. As shown in FIG. 5, the radial arm 172 is mounted to the actuator shaft 170 such that a line 175 extending between the arm pivot 176 and the second pivot axis 154 is positioned on a side of the actuator axis 168 when the first door 106 is in the closed position 112, In FIGS. 5 and 7, rotation of the radial arm 172 along the clockwise direction 173 causes the arm pivot 176 to trace an arcuate path and causes the line 175 between the arm pivot 176 and the second pivot axis 154 to pass over the actuator axis 168 such that the arcuate path of the arm pivot 176 results in the first door 106 initially pivoting slightly inwardly in a direction opposite the open position 110 of the first door 106 prior to the first door 106 pivoting outwardly toward the open position 110. The slightly inward pivoting of the first door 106 may be effective in breaking up ice or other contamination 40 that may be caked across the interface between the first door forward edge 128 and the door casing 138 and which may otherwise obstruct the outward pivoting of the first door 106 toward the open position 110.

Referring to FIG. 7, shown is the first door 106 in the closed position 112 and the second door 108 in the open position and illustrating the contamination 40 (e.g., ice) being broken up across the interface between the first door forward edge 128 and the door casing 138 as a result of slight inward movement of the first door forward edge 128 as a result of angular movement of the radial arm 172 along the clockwise direction 173 from point C1 to point C2. As shown in FIG. 7, with the free end 194 of the radial arm 172 stopped at point C2, the second door 108 is in the open position 110 with the opening 184 thereof facing aft which is preferably opposite the direction of the external flow 52. In the open position 110, the second door 108 may be effective in generating the external region aft of the second door 108 which preferably has an external pressure $p_e$ that is less than the cavity pressure $p_c$ within the suction cavity 38 in order to draw the external flow 52 (i.e., boundary layer adjacent the porous skin 30) through the pores 36 and into the suction cavity 38. The suction flow 44 may be ducted through the diffuser 74 for discharge through the second door 108 opening 184 and into the external atmosphere 50.

Figure 7A:
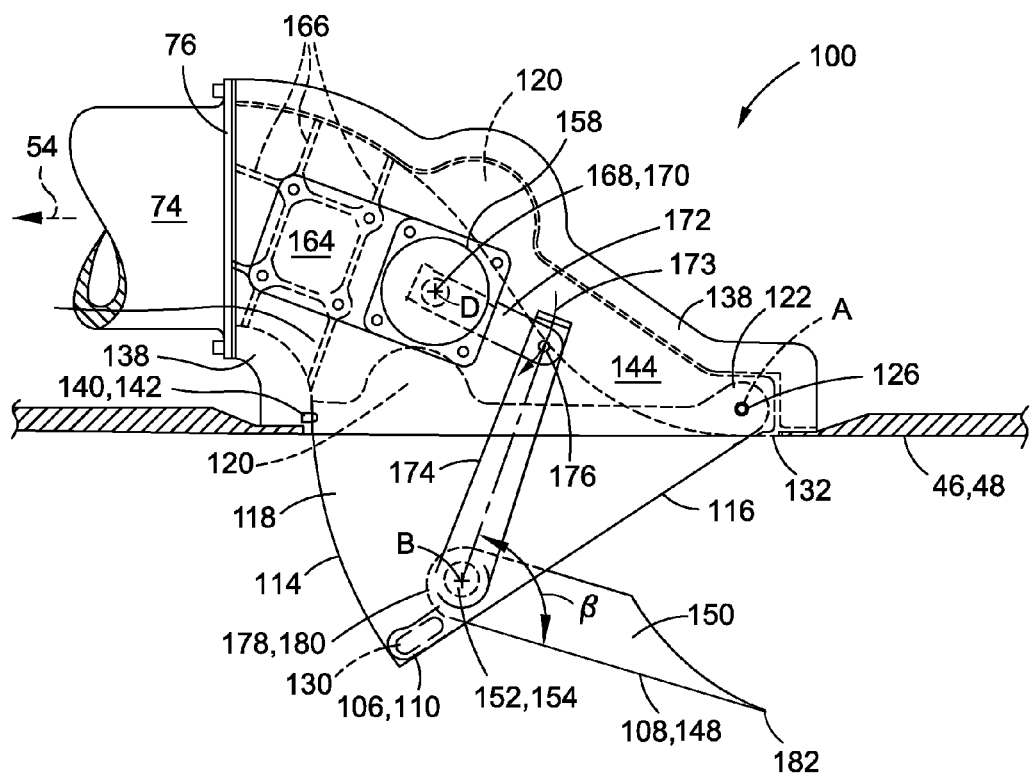
FIG. 7A is a side view of the door assembly illustrating the first door moving toward the final open position and the second door moving toward the closed position.

Referring to FIGS. 7 and 9, in order to move the first door 106 from the closed position 112 to the open position 110, the radial arm 172 rotates along the clockwise direction 173 from point C2 to point C4 during which the link 174 is pushed outward away from the actuator axis 168 causing the first door 106 to pivot about the first pivot axis 126 toward the open position 110. During such angular movement along the clockwise direction 173 from point C2 toward point C4, the second door 108 is initially caused to be pivoted outwardly to an increased angle relative to the first door 106 due to the fixed pivot angle θ between the link 174 and the second door 108. For example, FIG. 7A illustrates the first door 106 moving toward the final open position 114 and the second door 108 moving toward the closed position. In this regard, the second door pivot angle $θ_2$ temporarily increases during the initial movement of the radial arm 172 along the clockwise direction 173 from point C2 until the radial arm 172 reaches point C4 where the radial arm 172 stops at which point the second door 108 is in the final closed position 112. To close the fully opened first door 106, the radial arm 172 rotates in a counterclockwise direction (i.e., opposite the clockwise direction 173) from point C4 toward point C1 until the radial arm 172 stops at point C1 in FIG. 9.

Referring to FIGS. 5-6 and 9-10, when the second door 108 is in the closed position 112, the second door cowl 148 is preferably in alignment with the first door cowl 116. In this regard, the second door cowl 148 is preferably in alignment with the first door cowl 116 when the second door 108 is in the closed position 112 and the first door 106 is in either the closed or open position 110. The second door aft edge 182 forms part of the first door aft edge 132. In order to facilitate sealing engagement of the first and second doors 106, 108 with the door casing 138 when the first and second doors 106, 108 are in the closed position 112, the door assembly 100 is configured such that the first door aft edge 132 and second door aft edge 182 are generally aligned with one another and are engageable with the door casing 138 as shown in FIGS. 5-6.

When the first door 106 is in the open position 110 as shown in FIGS. 9-10, the second door 108 is in the closed position 112 such that the first door aft edge 132 and second door aft edge 182 are generally aligned with one another as indicated above. The first and second doors 106, 108 are preferably sized and configured to form a gap between the first and second door aft edges 132, 182 and the diffuser ramp 78. The gap comprises a particulate separator 134 or drain hole(s) 136 when first door 106 is in the open position 110 as shown in FIG. 9 wherein the first and second door aft edges 132, 182 are disposed in spaced relation to the door casing 138. The particulate separator 134 is preferably sized and configured to facilitate removal of moisture such as rain and other contaminants that may be caught in the external flow 52 captured by the first door 106. Due to the tendency of such particulates to continue in a straight line toward the aft end 104 of the first door 106 while the captured external flow 52 changes direction and enters the diffuser 74 at the diffuser inlet 76, the particulate separator 134 facilitates the separation of water or other contaminants from the captured external flow 52 such that dry air may be provided to the suction cavity 38. For moisture or contaminants that enter the diffuser 74, a drain mechanism 82 as shown in FIG. 2 may facilitate draining of such contaminants.

Referring to FIGS. 5, 7 and 9 and 12, shown is the sealing engagement of the first door 106 to the casing side panels 144. More particularly, FIGS. 5, 7 and 9 illustrate the sealing engagement of the first door 106 to the door casing 138 at the forward end 102 and/or aft end 104 of the door assembly 100. FIG. 12 illustrates the sealing engagement of the second door 108 to the first door 106 on each of opposing lateral sides 190 of the door assembly 100. Sealing may also be provided between the second door forward edge 178 and the first door 106. The door assembly 100 seals 140 are preferably included to provide aerodynamic sealing of the first door 106 with the door casing 138 and the casing side panels 144. In addition, the seals 140 are preferably included to resist twisting of the first door 106 and/or the second door 108 under the influence of aerodynamic loading as a result of the external flow 52 acting thereupon. More specifically, the aerodynamic center of pressure acting on the first door 106 is offset due to asymmetric support of the first door 106 as a result of the link 174 attachment on one of the lateral sides 190 of the first door 106.

The seals 140 are preferably provided to maintain continuous contact between the door casing 138 and the first door side walls 118 when the first door 106 is moved between the closed and open positions 110. By maintaining continuous contact between the door casing 138 and the first door side walls 118, twisting of the first door 106 may be prevented. Such twisting may slightly hinder the free pivoting of the first door 106 between the open and closed positions 110, 112 which may stabilize the first door 106. Furthermore, continuous contact between the seals 140 (i.e., casing side panels 144) and the first door side walls 118 may minimize or prevent the occurrence of flutter in the first door 106. As is known in the art, flutter in an aerodynamic surface may lead to undesirable effects including exceeding strength capabilities of the first door 106 and/or the structure to which the first door 106 is mounted. Likewise, the second door side walls 150 are preferably maintained in continuous contact with the first door 106 using a seal 140 and groove 142 arrangement as described below in order to provide aerodynamic sealing with the first door 106 and to minimize twisting in the second door 108 and prevent the occurrence of flutter.

Referring to FIG. 12, the casing side panels 144 may include a groove 142 preferably extending along a length of the casing side panel 144 from the forward end 102 to the aft end 104 of the door assembly 100. The groove 142 is preferably sized and configured to receive a seal 140 which is preferably sized to maintain sealing engagement with the first door side walls 118 during pivotable movement thereof between the open and closed positions 110, 112. In this regard, the first door side walls 118 may be triangularly-shaped in profile as shown in FIG. 12 and are preferably sized and configured to maintain continuous contact with the seals 140 through the range of pivoting movement of the first door 106. Toward this end, an ear 120 may be formed on at least one or, more preferably, both of the first door side walls 118. As can be seen in FIGS. 5, 7, 9 and 12, each one of the lateral sides 190 of the door assembly 100 may include a trough 196 configured to accommodate the ears 120 in addition to accommodating the edges of the first door side walls 118 along which the ears 120 are formed.

The formation of the ears 120 may prevent temporary loss of contact between the seals 140 and the first door side walls 118 as the first door 106 rotates from point C2 in FIG. 5 to point C4 in FIG. 9. Due to the rotational path of the free end 194 of the radial arm 172 from point C2 to point C4, the first door 106 is caused to pivot outwardly by a greater amount than the first door pivot angle $\theta_1$ of the first door 106 in the open position 110. By providing the ear 120 on each of the first door side walls 118, contact is maintained between the seals 140 and the first door side walls 118 during the temporary increase in pivot angle of the first door 106 as it moves to the open position 110. In this regard, the ears may avoid increased wear and tear of the seal 140 that may otherwise occur as a result of periodic contact of an edge of the first door side walls 118 against the seals 140 each time the first door 106 is moved between the open and closed positions 110, 112.

Referring to FIG. 12, the first door side walls 118 include a groove 142 preferably extending along at least a portion of the length thereof for receiving a seal 140. The seals 140 at this location are preferably configured to maintain continuous contact with the second door side walls 150 to provide aerodynamic sealing between the first and second doors 106, 108 and to prevent twisting of the second door 108. The seals 140 between the first and second door side walls 150 may also prevent or minimize the occurrence of flutter in the second door 108 as a result of the frictional engagement between the seal 140 and the first door side walls 118 and/or second door side walls 150. Although the seals 140 are illustrated and described as comprising bulb seals 140 mounted within grooves 142, any suitable sealing mechanism may be provided to facilitate aerodynamic and/or contamination sealing, minimize twisting and prevent flutter in the first and second doors 106, 108.

In furtherance of preventing twisting and/or flutter under aerodynamic loading, the first and second doors 106, 108 may each be provided in a generally U-shaped cross section as shown in FIG. 12 in order to enhance the torsional rigidity of the first and second doors 106, 108. As described above, the U-shaped cross section of the first door 106 may be provided by the first door side walls 118 extending generally perpendicularly relative to the first door cowl 116 as illustrated in FIGS. 10-12. Likewise, the U-shaped cross section of the second door 108 may be provided by the second door side walls 150 extending generally perpendicularly relative to the second door cowl 148 as is also illustrated in FIGS. 8, 11 and 12.

Referring to FIGS. 5, 7, 9-10, the first door 106 preferably includes a torque box 130 at a forward edge thereof for reacting torsional load on the first door 106. As was mentioned above, such torsional loading may result from the offset between the linkage assembly 192 connection to the first door 106 on the lateral side 190 thereof and the aerodynamic center of pressure acting on the first door 106 when in the open position 110. In this regard, the torque box 130 is preferably sized and configured to minimize twisting that may occur as a result of asymmetric support of the first door 106 due to support of the first door 106 on one side thereof. The torque box 130 may increase the torsional stiffness of the first door 106 and may prevent twisting and minimize the occurrence of flutter.

As best seen in FIGS. 5, 7 and 9, the torque box 130 may comprise a generally increased localized thickness at the first door forward edge 128 relative to the thickness of the first door cowl 116. The torque box 130 may have a hollow interior which may optionally be filled with a lightweight filler material such as syntactic foam to reduce the weight of the first door 106. Advantageously, the increased thickness of the first door forward edge 128 may also provide an increased area for sealing engagement with the seal 140 optionally mounted within a groove 142 formed in the door casing 138 at the forward end 102 of the door assembly 100. The first door forward edge 128 may also be provided with a generally rounded shape for aerodynamic purposes in association with the external flow 52 captured by the first door forward edge 128 when in the open position 110 as shown in FIGS. 9 and 10. In addition the first door forward edge 128 may be provided with a rounded shape to prevent the formation of ice on the first door forward edge 128 when in the open position 110.

Referring to FIGS. 13-19, shown is a door assembly 100 in an alternative embodiment which is similar to the door assembly 100 shown in FIGS. 5-12 and described above with the exception that the door assembly 100 shown in FIGS. 13-19 includes a pair of actuators 158 as opposed to the single actuator 158 of the door assembly 100 illustrated in FIGS. 5-12. In FIGS. 13-19, the door assembly 100 includes first and second actuators 160, 162 that are independently coupled to respective ones of the first and second doors 106, 108. The first actuator 160 may have an actuator axis 168 that may be aligned with the first pivot axis 126 and may be directly coupled to the first door 106 such that rotation of the first actuator 160 by a fixed amount causes pivoting of the first door 106 by an equal amount. The first actuator 160 may be mounted to one of the casing side panels 144 as shown in FIGS. 13-19.

The second actuator 162 may have an actuator axis 168 that may be aligned with the second pivot axis 154. The second actuator 162 may be directly coupled to the second door 108 such that rotation of the second actuator 162 by a fixed amount causes pivoting of the second door 108 by an equal amount. The second actuator 162 may have an actuator axis 168 that may be aligned with the second pivot axis 154. The second actuator 162 may have an actuator shaft 170 (not shown) that may be operatively coupled to the second door 108 using a spline arrangement similar to the spline arrangement illustrated in FIG. 12 for coupling the link 174 door shaft 156 to the second door 108. However, any suitable mechanism for coupling the second actuator 162 to the second door 108 may be used. The second actuator 162 is preferably fixedly mounted to the second door 108 at the second door forward edge 178 as shown to facilitate direct coupling thereof.

Figure 13:
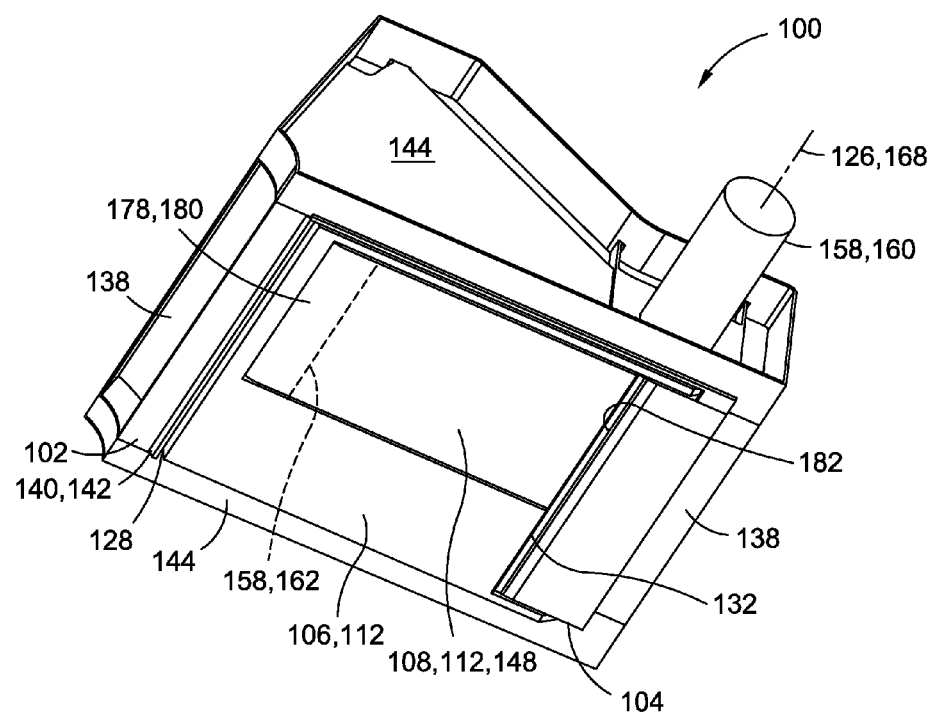
FIG. 13 is a perspective view of the door assembly in an embodiment having a pair of actuators independently coupled to the first and second doors.
Figure 14:
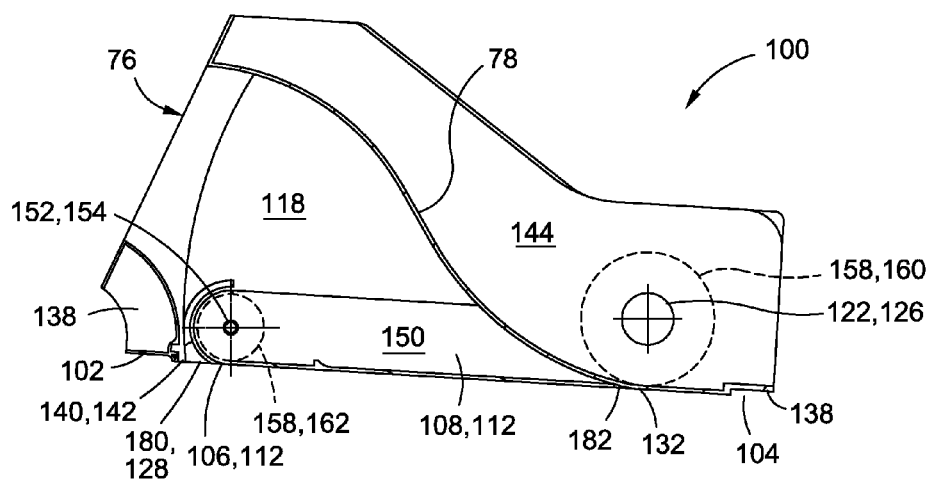
FIG. 14 is a sectional view of the door assembly shown in FIG. 13 and illustrating the first and second doors in the closed position.
Figure 15:
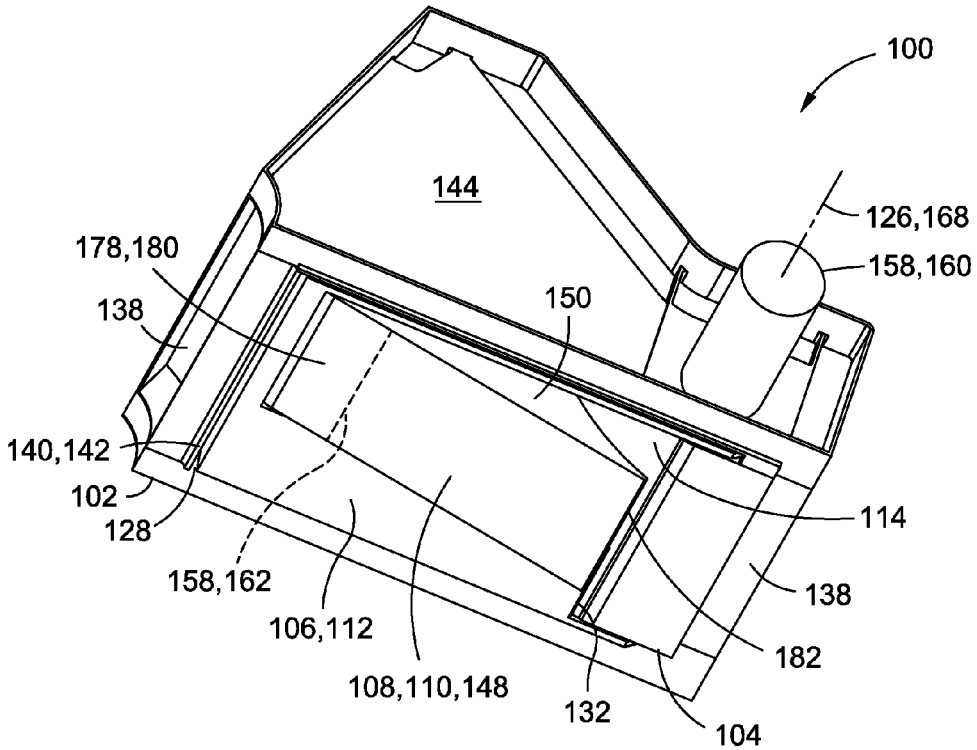
FIG. 15 is a perspective view of the door assembly having the pair of actuators and illustrating the first door in the closed position and the second door in the open position.
Figure 16:
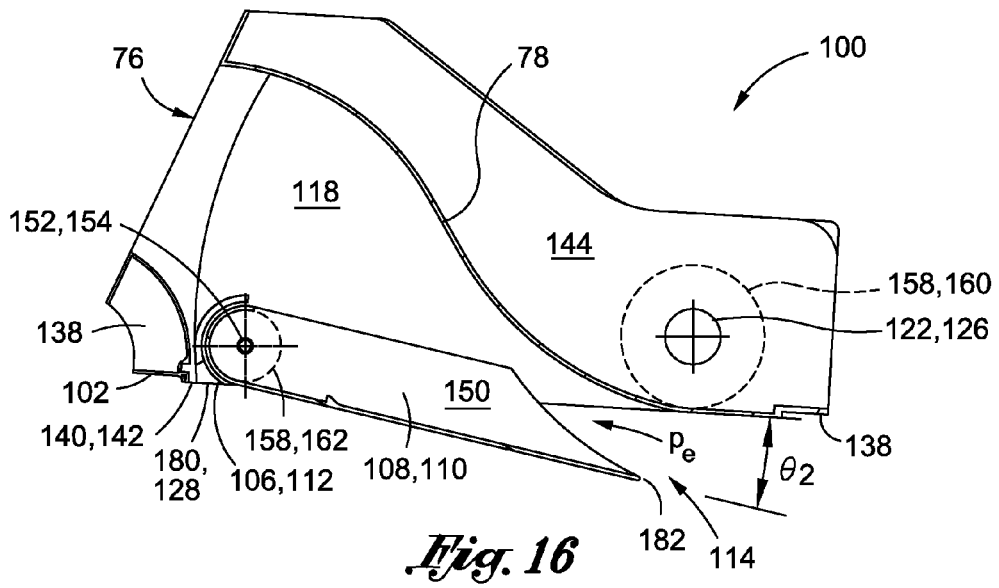
FIG. 16 is a sectional view of the door assembly shown in FIG. 15 and illustrating the first and second doors in the closed position.
Figure 17:
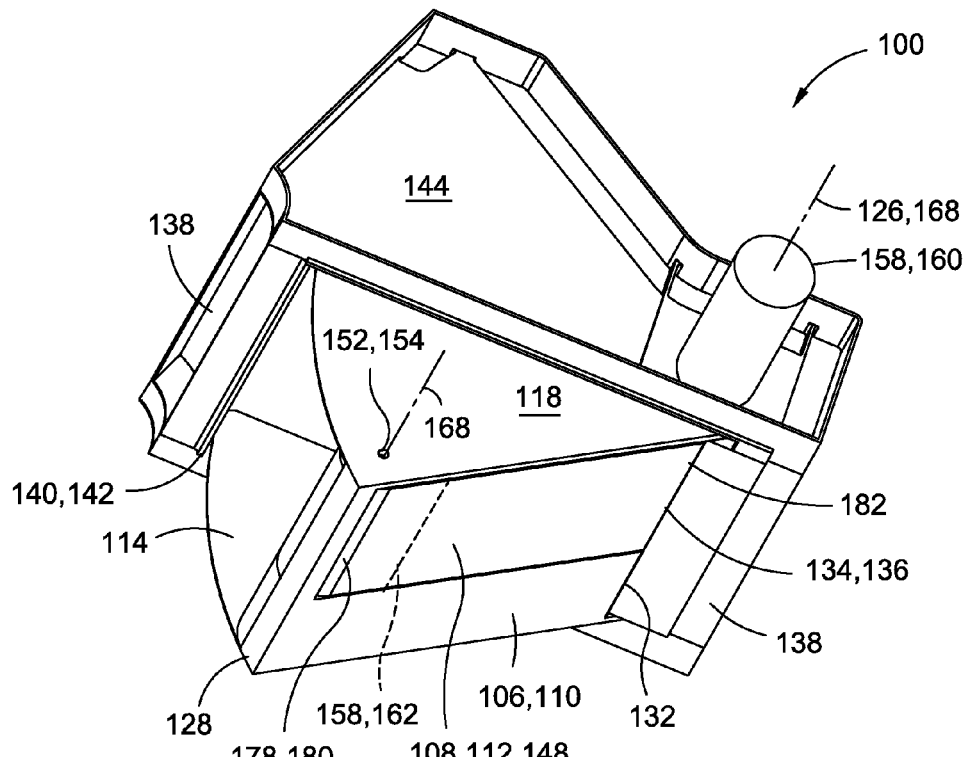
FIG. 17 is a perspective view of the door assembly having the pair of actuators and illustrating the first door in the open position and the second door in the closed position.
Figure 18:
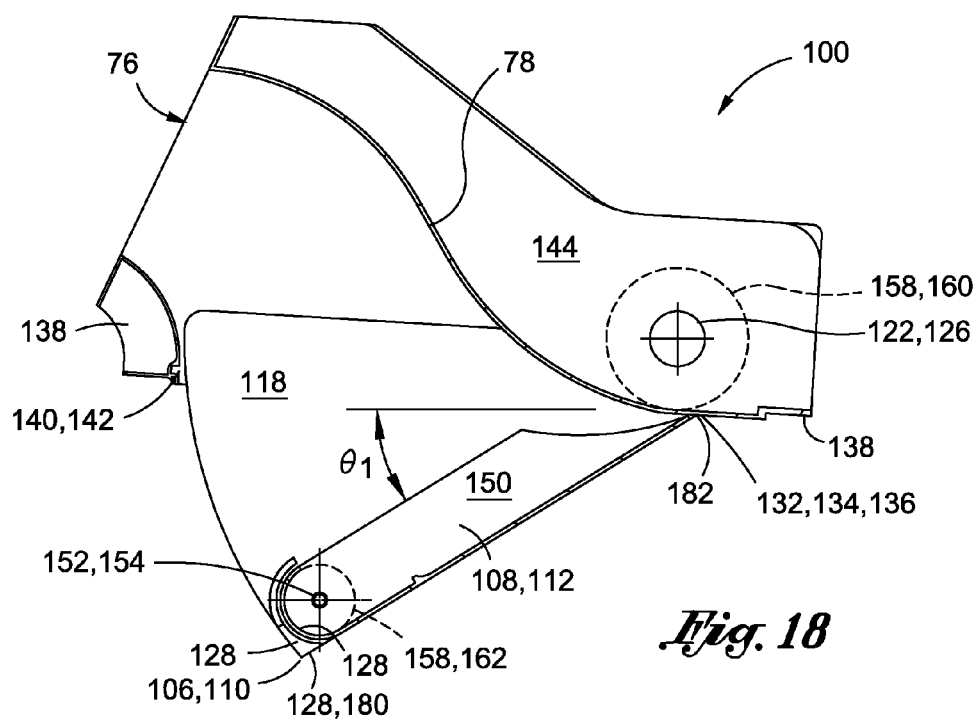
FIG. 18 is a sectional view of the door assembly shown in FIG. 17 and illustrating the first door in the open position and the second door in the closed position.

Referring still to FIGS. 13-19, the door assembly 100 may include a door casing 138 and casing side panels 144 arranged similar to the door casing 138 and casing side panels 144 of the door assembly 100 shown in FIGS. 5-12 and described above. In this regard, the door casing 138 and casing side panels 144 collectively form the frame for mounting of the first and second doors 106, 108. In addition, as shown in FIGS. 14, 16 and 18, the door casing 138 and casing side panels 144 collectively define the diffuser ramp 78 to which the diffuser 74 may be mounted in a manner similar to that shown in FIGS. 5, 7 and 9 and described above.

Figure 19:
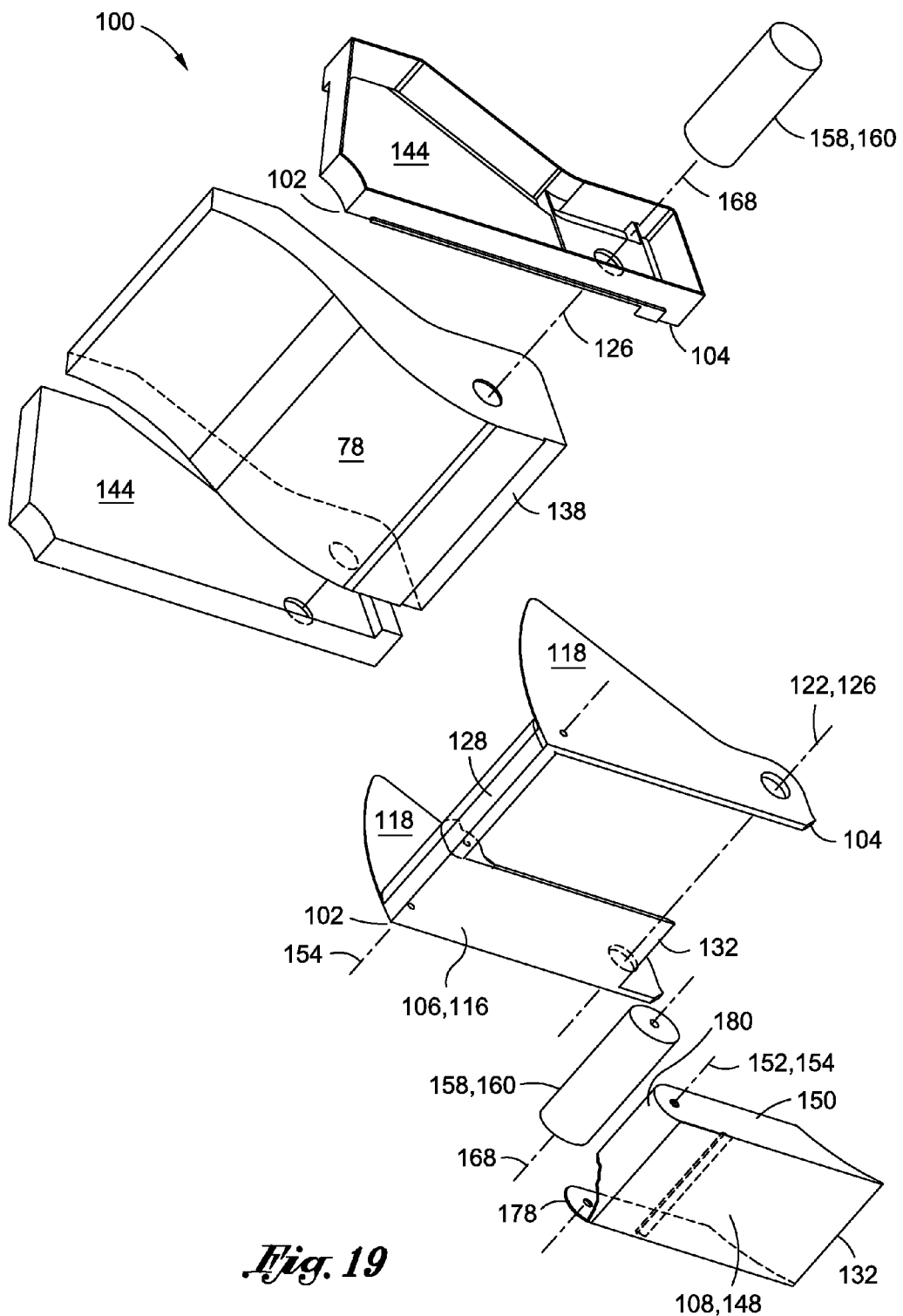
FIG. 19 is an exploded perspective view of the door assembly illustrating the interconnectivity of the pair of actuators to respective ones of the first and second doors.

Referring to FIGS. 13, 15 and 17, the first and second doors 106, 108 are each respectively comprised of first and second door 108 cowls. In addition, the first and second doors 106, 108 may each be provided in a generally U-shaped cross section as shown in FIGS. 17 and 19 in order to enhance the torsional rigidity or stiffness of the first and second doors 106, 108. As described above, the U-shaped cross section of the first and second doors 106, 108 may be formed by respective ones of the first and second door side walls 150 extending generally perpendicularly relative to corresponding ones of the first and second door 108 cowls.

Due to the lack of a linkage assembly 192 in the door assembly 100 of FIGS. 13-19, the ears 120 as described above may be omitted from the first door side walls 118. In this regard, the amount of angular movement of each one of the first and second doors 106, 108 is preferably respectively limited to the first and second door pivot angles $\theta_1$, $\theta_2$ of the first and second doors 106, 108 in the open positions 110 and preferably do not exceed such angular movement.

Referring to FIGS. 14, 16 and 18, torsional rigidity of the first door 106 may be increased by an increased thickness of the first door forward edge 128. The increased thickness of the first door forward edge 128 may be configured to having a height or thickness generally equivalent or similar to a height of the second door lip 180 at the second door forward edge 178. The door assembly 100 preferably includes seals 140 in a manner similar to that described above. The seals 140 may facilitate aerodynamic sealing of the door assembly 100. Additionally, the seals 140 may reduce twisting and prevent the occurrence of flutter. The first door side walls 118 are preferably triangularly shaped as described above to facilitate continuous contact with the seals 140 during movement of the first door 106 between the open and closed positions 110, 112.

Referring to FIGS. 1-12, the door assembly 100 can be described in the context of a methodology for purging and suctioning a laminar flow control system 72 having a porous skin 30. As illustrated in FIGS. 2-4 and described above, the laminar flow control system 72 may include the suction cavity 38 which is preferably disposed adjacent the porous skin 30 and is fluidly connected to the external atmosphere 50 through the pores 36 formed in the porous skin 30. The porous skin 30 may be positioned on an external surface 46 such as of an airfoil 22 wherein boundary layer control may be provided using suctioning.

The laminar flow control system 72 may include the door assembly 100 illustrated in FIGS. 5-12 and described above. The door assembly 100 may have the second door 108 pivotably mounted and integrated into the forward-facing first door 106. Each one of the first and second doors 106, 108 defines an opening 114, 184 when the first and second doors 106, 108 are moved to the open position 110. The first door 106 opening 114 is preferably forward-facing when the first door 106 is in the open position 110. The second door 108 opening 184 is preferably aft-facing when the second door 108 is in the open position 110. The door assembly 100 may be fluidly connected to the suction cavity 38 such as at the diffuser outlet 80 as shown in FIGS. 2-4.

With reference to FIGS. 2, 3, 5, 9 and 10, the method may optionally comprise an initial pivoting of the first door 106 slightly inwardly in a direction opposite the open position 110 prior to pivoting the first door 106 outwardly in a direction toward the open position 110 as shown with reference to FIGS. 5 and 7 and as described above. In this regard, the method may comprise an inward pivoting of the first door 106 such that the first door forward edge 128 is moved slightly inwardly relative to the door casing 138 at the forward end 102. Such inward pivoting of the first door 106 is a result of rotational movement of the free end 194 of the radial arm 172 along the clockwise direction 173 as the free end 194 rotates from point C1 toward point C2 as shown in FIGS. 5 and 7. Such slight inward movement of the first door forward edge 128 may facilitate the breakup of ice that may be caked across the interface between the first door forward edge 128 and the door casing 138.

Following the optional inward pivoting of the first door 106, the first door 106 may then be pivoted from the closed position 112 as shown in FIG. 5 to the open position 110 as shown in FIGS. 2, 3 and 9-10 as may be desired prior to takeoff and climb-out of an aircraft 10 in anticipation of rain or moisture-laden clouds. The first door 106 is preferably opened such that the first door 106 opening 114 captures the external flow 52 which is preferably of a relatively high pressure. The external flow 52 captured by the first door 106 and ducted to the suction cavity 38 preferably generates a cavity pressure $p_C$ within the suction cavity 38 that is greater than a local static pressure q exerted on the exterior skin surface 34 of the porous skin 30. The local static pressure q distribution on the leading edge porous skin 30 may be affected by the leading-edge sweep angle $\lambda_{LE}$ of the airfoil 22 illustrated in FIG. 2 as the vertical tail. An increase in leading-edge sweep angle $\lambda_{LE}$ generally results in a proportionate decrease in local static pressure q on the porous skin 30. In this regard, a larger leading-edge sweep angle $\lambda_{LE}$ may allow for a reduction in the area of the first door 106 opening 114.

Referring to FIGS. 2, 3, 9 and 10, the method may comprise the step of maintaining the second door 108 in the closed position 112 when the first door 106 is in the open position 110. Furthermore, the method may comprise aligning the second door cowl 148 of the second door 108 with the first door cowl 116 of the first door 106 when the first door 106 is in the open position 110 and the second door 108 is in the closed position 112. The method may additionally comprise ducting at least a portion of the external flow 52 through the first door 106 opening 114 and into the suction cavity 38 as shown in FIGS. 2-3. Such ducting may be facilitated through the use of the diffuser 74.

The method may comprise purging the pores 36 by discharging the ducted flow in the suction cavity 38 through the pores 36. The discharge through the pores 36 may facilitate clearing of the pores 36 of contaminants such as liquids and/or other debris and preventing blockage of the pores 36 by contaminants such as moisture when an aircraft 10 passes through clouds or rain. Following the purging of the pores 36, the first door 106 may be pivotably moved to the closed position 112 as shown in FIG. 5. When the first door 106 is in the closed position 112, the first door cowl 116 and the second door cowl 148 are preferably maintained in alignment with one another.

Referring to FIGS. 4, 7 and 8, the method may comprise the step of pivoting the second door 108 from the closed position 112 to the open position 110 to generate an external region aft of the second door 108 as shown in FIGS. 4 and 7. The second door 108 is preferably configured such that the external region preferably has an external pressure $p_e$ that is less than a cavity pressure $p_c$ of the suction cavity 38 such that the suction force is generated. The method may comprise suctioning or drawing the external flow 52 of air through the porous skin 30 and into the suction cavity 38 as shown in FIG. 4. As can be seen, the external flow 52 exerts the local static pressure q on the exterior skin surface 34 of the porous skin 30. The suction force generated by the external pressure $p_e$ aft of the second door 108 is preferably sufficient to duct the external flow 52 of air in the suction cavity 38 toward the second door 108 opening 184 for discharge through the second door 108 opening 184 and into the external atmosphere 50.

The above description is given by way of example and not limitation. Given the above disclosure, one skilled in the art could devise variations that are within the scope and spirit of the embodiments disclosed herein. Furthermore, the various features of the embodiments disclosed herein can be used alone or in any varying combinations with each other and are not intended to be limited to the specific combinations described herein. Thus, the scope of the claims is not to be limited by the illustrated embodiments.

What is claimed is:

1. A method of operating a door assembly including a first door and second door, comprising the steps of:
    pivoting the first door to the closed position;
    pivoting the second door about a second pivot axis from a closed position to an open position when the first door is in the closed position such that when the second door is in the a fully open position, an opening of the second door faces in a direction opposite the direction of an opening of the first door when the first door is in the a fully open position;
    pivoting the first door about a first pivot axis from a closed position to an open position such that the first door acts as an inlet; pivoting the first door to the closed position; pivoting the second pivot axis about the first pivot axis when pivoting the first door, the second door being of a smaller size than the first door and forming at least a portion of the first door; and
    pivoting the first door and the second door between each door's respective open and closed positions using a single actuator and a linkage assembly comprising a radial arm fixedly coupled to the actuator and a link pivotably coupling the radial arm to the second pivot axis.

2. The method of claim 1 further comprising the steps of:
    selectively maintaining the first door in the closed position when the second door is in the open position; and
    selectively maintaining the second door in the closed position when the first door is in the open position.

3. The method of claim 1 further comprising the step of:
maintaining a second door cowl in alignment with a first door cowl when the second door is in the closed position and the first door is in at least one of the open and closed positions.

4. The method of claim 1 further comprising the steps of:
coupling an actuator shaft of the single actuator to the first door and the second door; and
rotating the actuator shaft to cause pivoting of the first door about the first pivot axis and pivoting of the second door about the second pivot axis.

5. The method of claim 4, further comprising the steps of:
fixedly coupling the radial arm to the actuator shaft such that the radial arm is rotatable about an actuator axis;
coupling, using a link, an arm pivot of the radial arm to the second pivot axis of the second door, the second pivot axis moving with the first door during pivoting of the first door;
mounting the radial arm to the actuator shaft such that a line extending between the arm pivot and the second pivot axis is positioned on a side of the actuator axis when the first door is in a closed position; and
rotating the radial arm causing the arm pivot to trace an arcuate path and causing the line between the arm pivot and the second pivot axis to pass over the actuator axis such that the arcuate path of the arm pivot results in the first door initially pivoting slightly inwardly in a direction opposite the open position of the first door prior to the first door pivoting outwardly toward the open position.

6. The method of claim 1 further comprising the step of:
maintaining sealing engagement of a first door side wall with a casing side panel during pivotable movement of the first door.

7. The method of claim 1 further comprising the step of:
maintaining sealing engagement of the second door to the first door during pivotable movement of the second door.

* * * * *